United States Patent
Hirzallah et al.

(10) Patent No.: US 12,445,211 B2
(45) Date of Patent: Oct. 14, 2025

(54) SENSITIVITY TIME CONTROL SIGNALING

(71) Applicant: Qualcomm Incorporated, San Diego, CA (US)

(72) Inventors: Mohammed Ali Mohammed Hirzallah, San Marcos, CA (US); Xiaoxia Zhang, San Diego, CA (US); Marwen Zorgui, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 161 days.

(21) Appl. No.: 18/477,071

(22) Filed: Sep. 28, 2023

(65) Prior Publication Data

US 2025/0112713 A1  Apr. 3, 2025

(51) Int. Cl.
| | | |
|---|---|---|
| H04B 17/20 | (2015.01) | |
| H04B 17/336 | (2015.01) | |
| H04B 17/345 | (2015.01) | |
| H04W 72/56 | (2023.01) | |

(52) U.S. Cl.
CPC ......... H04B 17/203 (2023.05); H04B 17/204 (2023.05); H04B 17/336 (2015.01); H04B 17/345 (2015.01); H04W 72/56 (2023.01)

(58) Field of Classification Search
CPC .... H04B 17/13; H04B 17/203; H04B 17/204; H04B 17/328; H04B 17/336; H04B 17/345; H04W 72/54; H04W 72/56
USPC ........ 375/219, 224, 227, 259, 260; 370/328, 370/329, 332, 345; 455/500, 67.11, 67.13
See application file for complete search history.

(56) References Cited

U.S. PATENT DOCUMENTS

| | | | | |
|---|---|---|---|---|
| 2013/0005240 A1* | 1/2013 | Novak | ................... | H04W 88/04 455/11.1 |
| 2023/0362898 A1* | 11/2023 | Jeon | ........................ | G01S 7/0235 |
| 2023/0370820 A1* | 11/2023 | Cheng | ..................... | H04W 8/22 |

(Continued)

FOREIGN PATENT DOCUMENTS

| | | | | |
|---|---|---|---|---|
| CN | 116194798 A | * | 5/2023 | ........... G01S 13/003 |
| JP | 2000098022 A | | 4/2000 | |

(Continued)

OTHER PUBLICATIONS

CMCC: "MRO for Inter-system Handover Voice Fallback", 3GPP TSG-RAN WG3 Meeting #117, R3-224902, 3rd Generation Partnership Project (3GPP), Mobile Competence Centre, 650, Route Des Lucioles, F-06921 Sophia-Antipolis Cedex, France, vol. RAN WG3, No. Online, Aug. 15, 2022-Aug. 24, 2022, Aug. 9, 2022, 3 Pages, XP052265068, Section 2.1, p. 1 section 2.2, p. 3.

(Continued)

Primary Examiner — Young T. Tse
(74) Attorney, Agent, or Firm — SUNSTEIN LLP

(57) ABSTRACT

A sensing method includes: implementing, at a UE, a sensitivity time control profile to change a gain applied over time to a sensing signal received by the UE; and measuring the sensing signal to obtain a sensing signal measurement; wherein the method comprises at least one of: obtaining the sensitivity time control profile based on a sensitivity time control message received by the UE from a network entity; or transmitting a sensing report from the UE to the network entity, the sensing report indicating a measurement of the sensing signal and that sensitivity time control was implemented to obtain the sensing signal measurement.

30 Claims, 10 Drawing Sheets

(56) References Cited

U.S. PATENT DOCUMENTS

2024/0397476 A1\* 11/2024 Wang .................. H04W 8/22
2024/0422744 A1\* 12/2024 Duan .................. G01S 13/003

FOREIGN PATENT DOCUMENTS

KR        20220046153 A     4/2022
WO    WO-2012037670 A1 \*   3/2012  .............. H04B 7/26

OTHER PUBLICATIONS

International Search Report and Written Opinion—PCT/US2024/043951—ISA/EPO—Dec. 2, 2024.

\* cited by examiner

| STC capability (Y/N) | STC profile(s) available (Y/N) | Available STC profile(s) (if any) | Ability to apply STC profile based on frequency (F), direction (D) (beam), polarization (Pol), pulse |
|---|---|---|---|
| Y | Y | ParamSet1 | F, P |
| | | ParamSet2 | F, D, Pol |
| | | STCcode1 | D, pulse |

FIG. 12

| STC profile indication (e.g., profile description (profile parameters) and granularity (e.g., frequency range, receive direction, pulse/processing repetition interval, polarization, etc.)) | STC consideration(s) (e.g., clutter profile(s)) | STC profile condition(s) (e.g., area, Rx signal KPI (e.g., RSSI, SINR, dynamic range, etc.)) | STC profile prioritization rule(s) (e.g., area, Rx signal KPI (e.g., RSSI, SINR, dynamic range, etc.)) |
|---|---|---|---|
| ParamSet1 (F1, D1) | | F1, D1 | Area2 |
| ParamSet2 (F2, Pol1) | | | Area1, RSSI2 |
| STCcode1 | | F2, Pol1 | Area1, RSSI1 |
| | ClutterProfile1 | | |
| | CLutterProfile2 | | |

FIG. 13

SENSITIVITY TIME CONTROL SIGNALING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

Radio frequency sensing (RF sensing) may be used to determine information about an environment of a device. In RF sensing, an RF signal, called a sensing signal, is transmitted by a transmitter, reflected off a target object, and received by a receiver. The sensing signal may be used for sensing and one or more other purposes, e.g., communication. The received signal may be used to determine characteristics of the target object, e.g., location, size, material, movement, etc. RF sensing may be achieved using various techniques such as radar, radio frequency identification (RFID), and/or wireless sensor networks. In RFID techniques, RF signals may be used for identification and/or tracking. Tags or transponders that contain a unique identifier may communicate with RFID readers using RF signals. By placing the RFID tags on objects, the objects may be identified, tracked, and managed. RF sensing may be used for a variety of applications such as automotive (collision avoidance, autonomous driving, adaptive cruise control, etc.), surveillance and security, object detection, inventory management, medication management, environmental monitoring, etc.

SUMMARY

An example UE (user equipment) includes: one or more memories; one or more transceivers configured to receive a sensing signal; and one or more processors, communicatively coupled to the one or more memories and the one or more transceivers, configured to: implement a sensitivity time control profile to change a gain applied over time to the sensing signal by the one or more transceivers; and measure the sensing signal to obtain a sensing signal measurement; wherein the one or more processors are at least one of: configured to obtain the sensitivity time control profile based on a sensitivity time control message received from a network entity via the one or more transceivers; or configured to transmit a sensing report to the network entity via the one or more transceivers, the sensing report indicating a measurement of the sensing signal and whether sensitivity time control was implemented to obtain the sensing signal measurement.

An example sensing method includes: implementing, at a UE (user equipment), a sensitivity time control profile to change a gain applied over time to a sensing signal received by the UE; and measuring the sensing signal to obtain a sensing signal measurement; wherein the method comprises at least one of: obtaining the sensitivity time control profile based on a sensitivity time control message received by the UE from a network entity; or transmitting a sensing report from the UE to the network entity, the sensing report indicating a measurement of the sensing signal and that sensitivity time control was implemented to obtain the sensing signal measurement.

Another example UE includes: means for implementing a sensitivity time control profile to change a gain applied over time to a sensing signal received by the UE; and means for measuring the sensing signal to obtain a sensing signal measurement; wherein the UE further comprises at least one of: means for obtaining the sensitivity time control profile based on a sensitivity time control message received by the UE from a network entity; or means for transmitting a sensing report from the UE to the network entity, the sensing report indicating a measurement of the sensing signal and that sensitivity time control was implemented to obtain the sensing signal measurement.

An example non-transitory, processor-readable storage medium includes processor-readable instructions to cause one or more processors of a UE (user equipment) to: implement a sensitivity time control profile to change a gain applied over time to a sensing signal received by the UE; and measure the sensing signal to obtain a sensing signal measurement; wherein the storage medium further comprises at least one of: processor-readable instructions to cause one or more processors of the UE to obtain the sensitivity time control profile based on a sensitivity time control message received by the UE from a network entity; or processor-readable instructions to cause one or more processors of the UE to transmit a sensing report from the UE to the network entity, the sensing report indicating a measurement of the sensing signal and that sensitivity time control was implemented to obtain the sensing signal measurement.

An example network entity includes: one or more memories; one or more transceivers; and one or more processors, communicatively coupled to the one or more memories and the one or more transceivers, configured to: determine sensitivity time control configuration information indicating at least one of: a sensitivity time control profile, a clutter profile corresponding to a location, or one or more criteria to be met for a UE (user equipment) to implement sensitivity time control; and transmit the sensitivity time control configuration information to the UE via the one or more transceivers.

An example method, for supporting sensitivity time control for sensing by a UE (user equipment), includes: determining, at a network entity, sensitivity time control configuration information indicating at least one of: a sensitivity time control profile, a clutter profile corresponding to a location, or one or more criteria to be met for the UE to implement sensitivity time control; and transmitting, from the network entity to the UE, the sensitivity time control configuration information to the UE via the one or more transceivers.

Another example network entity includes: means for determining sensitivity time control configuration information indicating at least one of: a sensitivity time control profile, a clutter profile corresponding to a location, or one or more criteria to be met for a UE (user equipment) to implement sensitivity time control; and means for transmitting, to the UE, the sensitivity time control configuration information to the UE via the one or more transceivers.

Another example non-transitory, processor-readable storage medium includes processor-readable instructions to cause one or more processors of a network entity to: determine sensitivity time control configuration information indicating at least one of: a sensitivity time control profile, a clutter profile corresponding to a location, or one or more criteria to be met for a UE (user equipment) to implement sensitivity time control; and transmit, to the UE, the sensitivity time control configuration information to the UE via the one or more transceivers.

BRIEF DESCRIPTION OF THE DRAWINGS

FIG. 12 is an example of a sensitivity time control (STC) capabilities table that is an example of content of an STC capabilities message shown in FIG. 11.

FIG. 13 is an example of an STC configuration information table that is an example of an STC configuration information message shown in FIG. 11.

DETAILED DESCRIPTION

Figure 1:
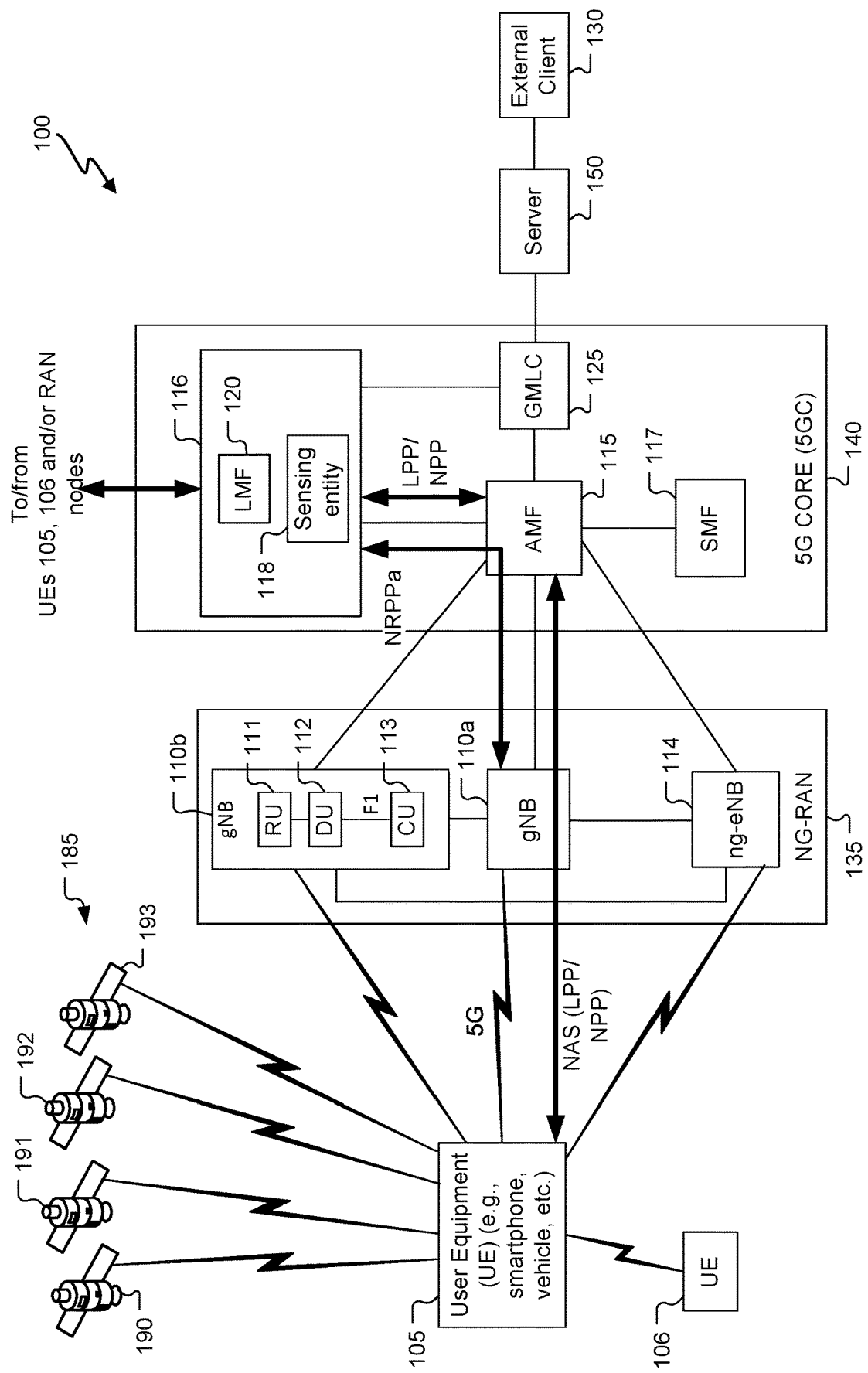
FIG. 1 is a simplified diagram of an example wireless communications system.

Techniques are discussed herein for transferring sensitivity time control (STC) information. For example, STC capability of a user equipment (UE) may be requested from a UE and/or provided a UE. Also or alternatively, STC configuration information may be requested from a network entity and/or provided by a network entity to a UE. The STC configuration information may indicate one or more STC profiles of different gains over time to be implemented by a UE (or other device receiving a sensing signal). The STC configuration information may include information from which an STC profile may be determined (e.g., from which one or more STC profiles may be derived and/or from which one or more STC profiles may be selected from among one or more stored STC profiles). An effective STC profile (e.g., that yielded one or more accurate sensing measurements) may be reported and this information used to provide STC configuration information to the reporting entity and/or to one or more other entities. Other configurations/implementations, however, may be used.

Items and/or techniques described herein may provide one or more of the following capabilities, as well as other capabilities not mentioned. Radio frequency (RF) sensing accuracy (e.g., target object detection accuracy, target object location determination accuracy, and/or target object velocity determination accuracy) may be improved. RF sensing accuracy may be improved for different sensing applications, different sensing environments (e.g., different clutter profiles), and/or different target object detection conditions (e.g., short-range target objects and long-range target objects). The quality of received RF sensing may be enhanced by mitigating clutter of nearby clutter sources. The efficiency of a dynamic range of a receiver may be enhanced and/or a situation caused by nearby clutter sources avoided. Dynamic adaptation and configuration of STC applied at an RF sensing receiver may be enabled, e.g., to provide an improved RF sensing quality and performance. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, network entities 116 (including a sensing entity 118, and a Location Management Function (LMF) 120), and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the network entities 116, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The sensing entity 118 and the LMF 120 may communicate directly with the UE 105, e.g., through wireless communications, or directly with the gNBs 110a, 110b and/or the ng-eNB 114. The sensing entity 118 may support RF sensing operations and process RF sensing requests, e.g., by determining and providing sensing signal configurations. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates, sensing information, and/or information provided by the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the network entities 116 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the network entities 116, and/or between the ng-eNB 114 and the network entities 116, via the AMF 115. As further illustrated in FIG. 1, the network entities 116 and the UE 105 may communicate using an LTE Positioning Protocol (LPP), which may be defined in 3GPP TS 36.355. The network entities 116 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the network entities 116 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. One or more of the network entities 116 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the network entities 116 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
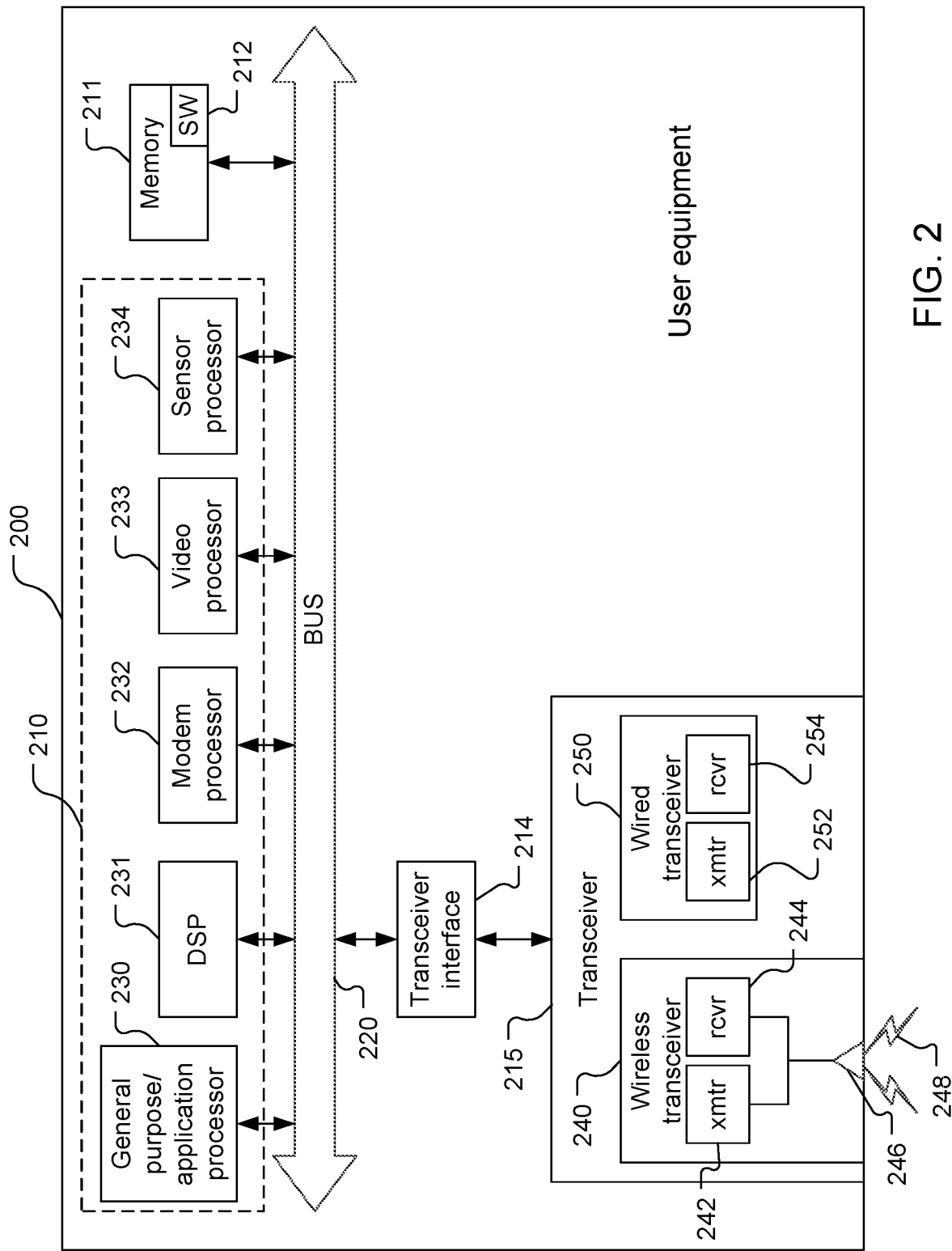
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, and a transceiver interface 214 for a transceiver 215 (that includes a wireless transceiver 240 and a wired transceiver 250). The processor 210, the memory 211, and the transceiver interface 214 may be communicatively coupled to each other by a bus 220 (which may be configured, e.g., for optical and/or electrical communication). The UE 200 may include one or more apparatus not shown (e.g., a camera, a position device, and/or one or more sensors, etc.). The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of sensors, a user interface, an SPS receiver, a camera, and/or a position device (e.g., for determining position of the UE 200 by means other than satellite signals).

The UE 200 may comprise the modem processor 232 that may be capable of performing baseband processing of signals received and down-converted by the transceiver 215. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

Figure 3:
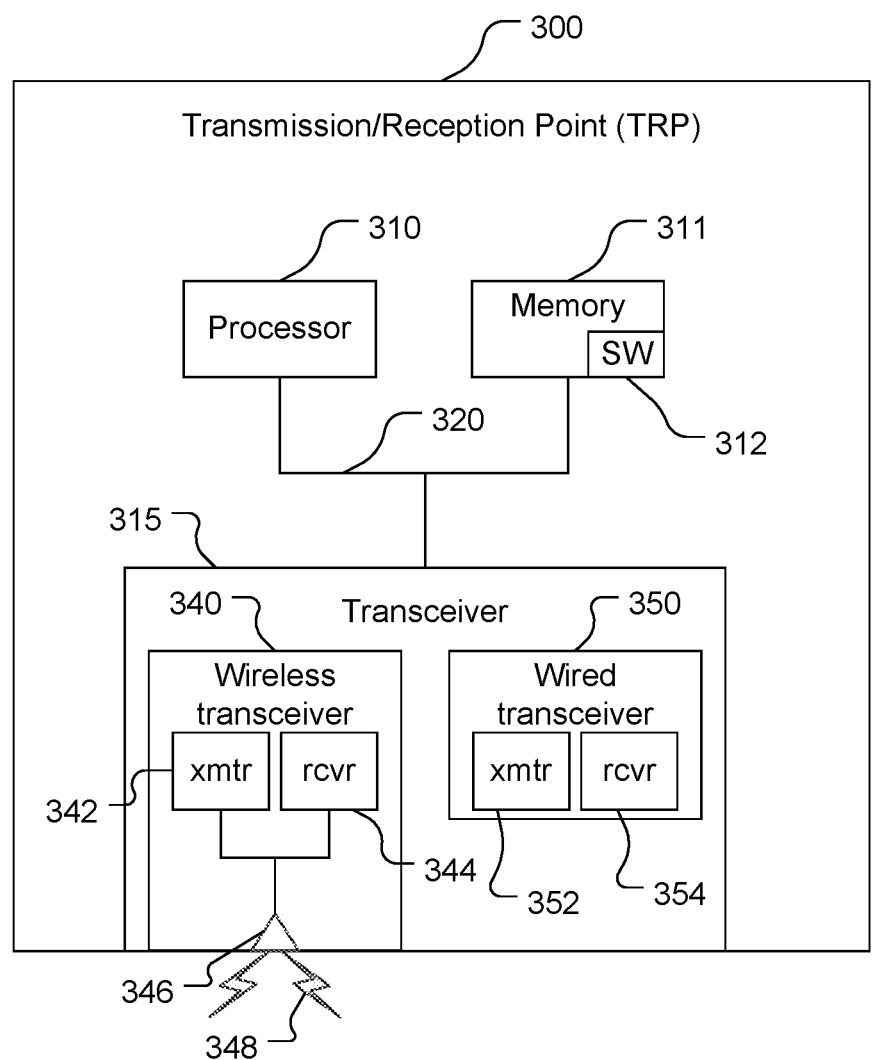
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
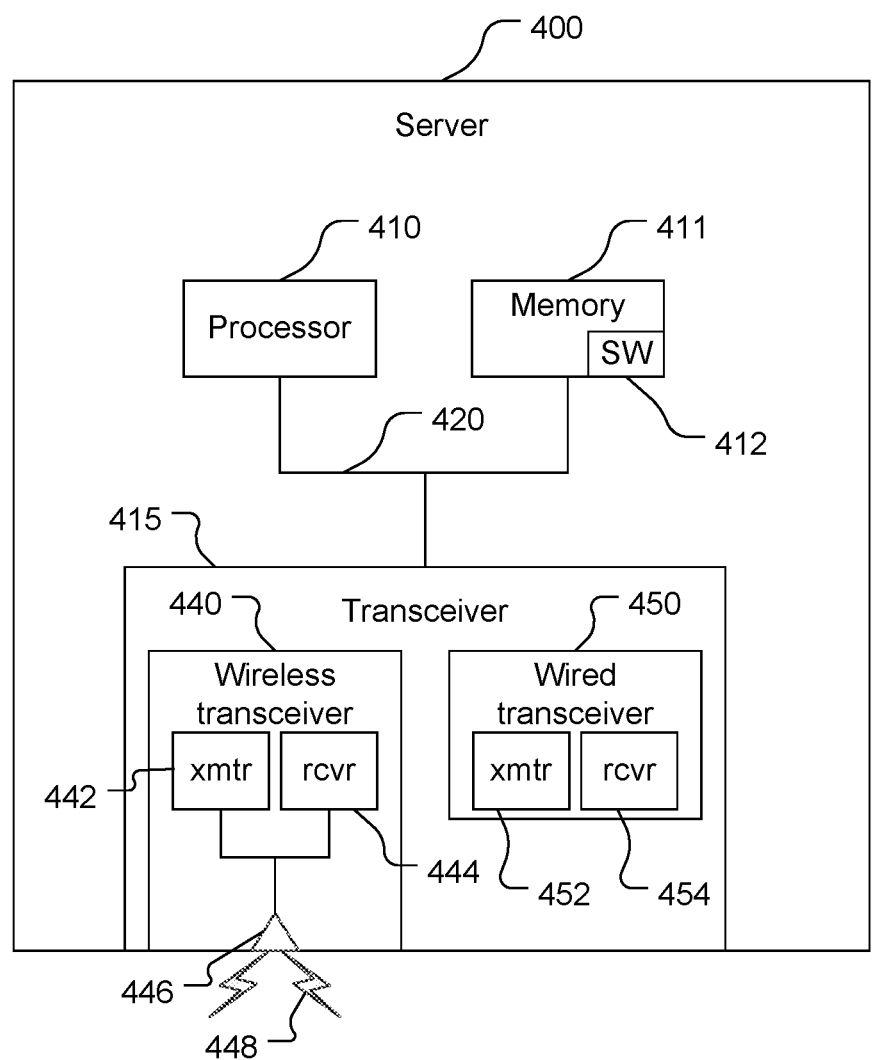
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

RF Sensing with Sensitivity Time Control

Figure 5:
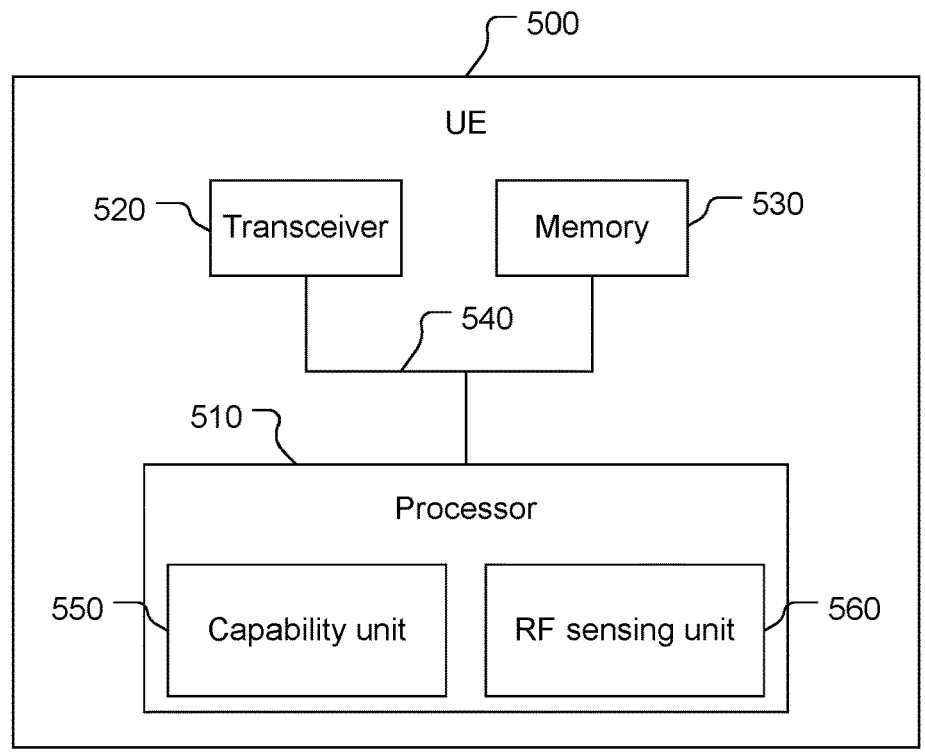
FIG. 5 is a block diagram of a user equipment.

Referring also to FIG. 5, a UE 500 includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a capability unit 550 and/or an RF sensing unit 560. The capability unit 550 may be configured to send a capability message indicating one or more capabilities of the UE 500 to implement STC to measure sensing signals. The RF sensing unit 560 may be configured to request STC configuration information (e.g., one or more STC profiles and/or information that the UE 500 may use to determine (e.g., derive or select) an STC profile to implement for RF sensing). The capability unit 550 and the RF sensing unit 560 are discussed further below, and the description may refer to the processor 510 generally, or the UE 500 generally, as performing any of the functions of the capability unit 550 and/or the RF sensing unit 560, with the UE 500 being configured to perform the function(s).

Figure 6:
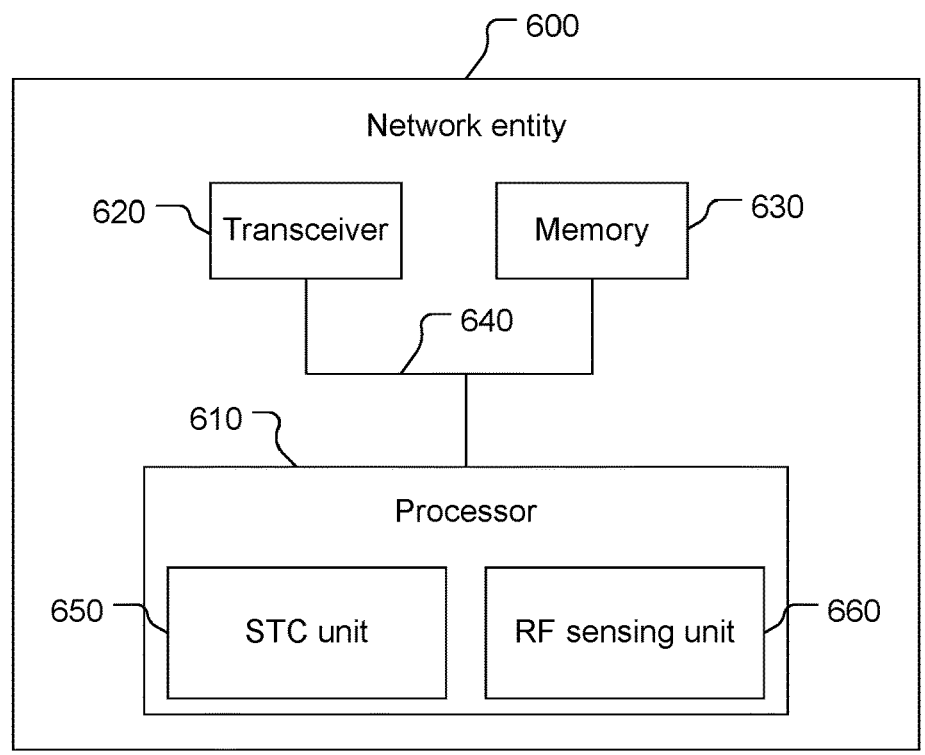
FIG. 6 is a block diagram of a network entity/

Referring also to FIG. 6, a network entity 600 includes a processor 610, a transceiver 620, and a memory 630 communicatively coupled to each other by a bus 640. The network entity 600 may be, for example, a base station, a TRP, a server, etc. Even if referred to in the singular, the network entity 600 may include one or more network entities, the processor 610 may include one or more processors, the transceiver 620 may include one or more transceivers (e.g., one or more transmitters and/or one or more receivers), and the memory 630 may include one or more memories. The network entity 600 may include the components shown in FIG. 6. The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include an STC unit 650 and/or an RF sensing unit 660. The STC unit 650 may be configured to determine STC configuration information (e.g., one or more STC profiles and/or information that the UE 500 may use to determine (e.g., derive or select) an STC profile to implement for RF sensing. The RF sensing unit 660 (e.g., with the network entity 600 being a TRP) may be configured to transmit sensing signals and/or receive and measure sensing signals. The STC unit 650 and the RF sensing unit 660 are discussed further below, and the description may refer to the processor 610 generally, or the network entity 600 generally, as performing any of the functions of the STC unit 650 and/or the RF sensing unit 660, with the network entity 600 being configured to perform the function(s).

Figure 7:
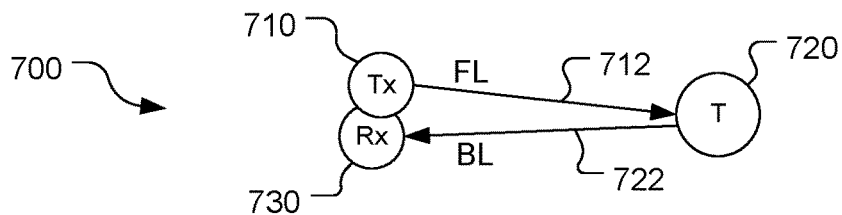
FIG. 7 is a block diagram of a monostatic sensing system.
Figure 8:
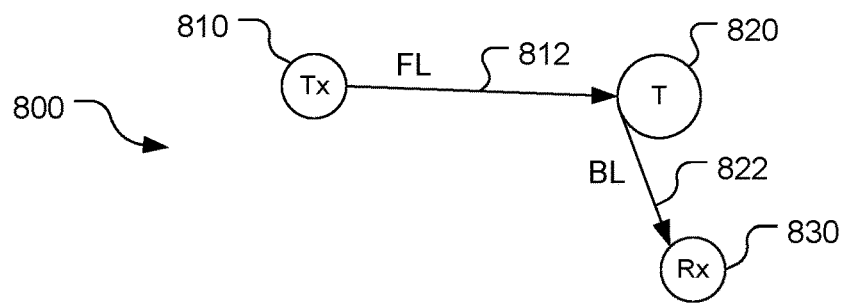
FIG. 8 is a block diagram of a bi-static sensing system.

Referring also to FIGS. 7 and 8, various configurations of sensing systems, such as monostatic sensing systems or bi-static sensing systems, may be implemented. For example, as shown in FIG. 7, a monostatic sensing system 700 includes a transmit node 710, a target object 720, and a receive node 730. In this case, the transmit node 710 and the receive node 730 are co-located and may be portions of a single physical device. The transmit node 710 may transmit an FL signal 712 (forward link signal), and the target object 720 may backscatter (e.g., reflect) a BL signal 722 (backscatter link signal) based on the incoming signal, i.e., the FL signal 712. The receive node 730 may receive and measure the BL signal 722. A transmit (Tx) node or a receive (Rx) node may be, for example, a UE, a TRP, or a RAN node. As shown in FIG. 8, a bi-static sensing system 800 includes a transmit node 810, a target object 820, and a receive node 830. In this case, the transmit node 810 and the receive node 830 are non-co-located. The transmit node 810 may transmit an FL signal 812, the target object 820 may backscatter a BL signal 822 based on the FL signal 812, and the receive node 830 may receive and measure and/or decode the BL signal 822.

A sensing system may be configured as a multi-static sensing system, in which there are multiple transmit nodes and/or multiple receive nodes. In a multi-static sensing system, there may be one or more monostatic systems and/or one or more bi-static systems.

Figure 9:
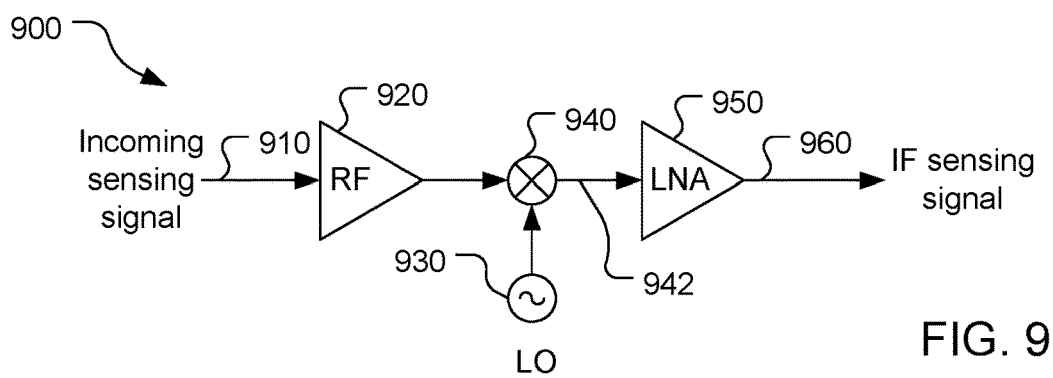
FIG. 9 is a block diagram of portions of a sensing signal receiver.

Referring also to FIG. 9, receive circuitry 900 may be used by a receiver in any type of sensing system to receive and process a sensing signal for measurement, e.g., by one or more processors. The receive circuitry 900 is an example of receive circuitry, and may comprise, for example, a portion of the transceiver 520. The receive circuitry 900 includes an RF amplifier 920, an LO 930 (Local Oscillator), a mixer 940, and an LNA 950 (Low-Noise Amplifier). An incoming sensing signal 910 (e.g., that has been reflected by a target object) may be amplified by the RF amplifier 920. The incoming sensing signal 910 as output by the RF amplifier 920 may be mixed with an LO signal from the LO 930 to convert the RF frequency of the sensing signal 910 to an intermediate-frequency signal 942 at an intermediate frequency. The intermediate-frequency signal 942 may be amplified by the LNA 950 to produce an IF sensing signal 960 that may be provided to further circuitry, not shown, for conversion to baseband and further processing (e.g., measurement).

In RF sensing (e.g., as discussed with respect to FIGS. 7 and 8), a wireless signal may be transmitted from one or multiple transmit points and received at one or multiple receive points after being reflected off a target. RF sensing may enable many candidate applications, such as intruder detection, animal/pedestrian/UAV (Unoccupied Aerial Vehicle) intrusion detection in highways and railways, rainfall monitoring, flooding awareness, autonomous driving, AGV (Automatic Guided Vehicle) detection/tracking/collision avoidance, smart parking & assistance, UAV trajectory and tracking, crowd management, sleep/health monitoring, gesture recognition, XR streaming, public safety search & rescue, etc. The longer the range of a target object (a target whose location and/or velocity is desired to be known), the weaker the return at a receiver (because signal power is inversely proportional to $R^2$, where R is distance from a transmitter, such that received power is inversely proportional to $R^4$ if a transmitter and receiver are co-located). Objects other than target objects may be referred to as clutter. Clutter sources at short distances/ranges may cause relatively high-power reflections and exceed a dynamic range of a receiver such that the receiver may be unable to detect weaker target returns at longer distances.

Figure 10:
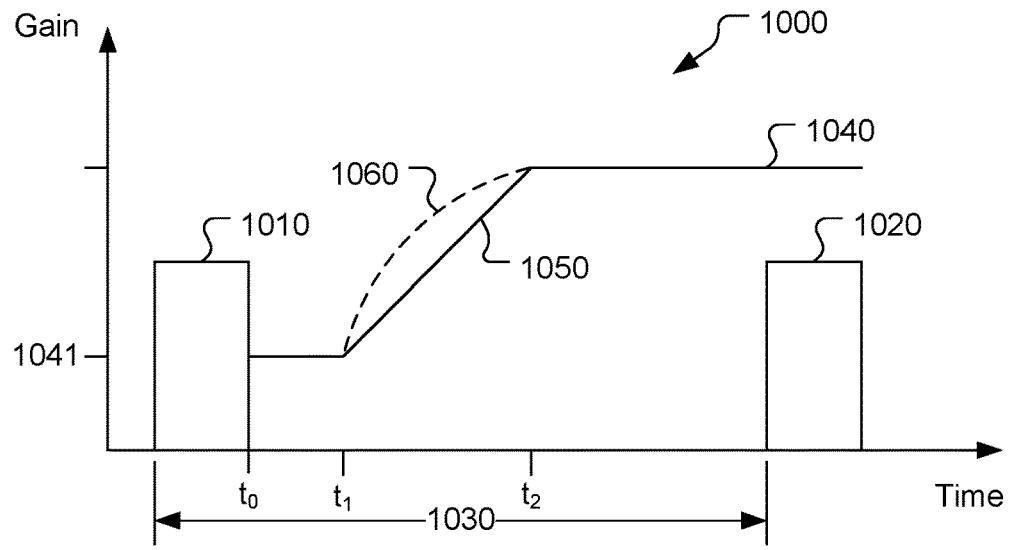
FIG. 10 is a graph of gain as a function of time for sensitivity time control.

Referring also to FIG. 10, gain of a receiver, such as the receiver 900, may be adjusted according to an STC (Sensitivity Time Control) profile (of gain as a function of time). For example, as shown in a graph 1000, an RF sensing signal pulse 1010 (which may be part of a pulse train, and which may be called a chirp) and an RF sensing signal pulse 1020 are transmitted at different times separated by a pulse/chirp repetition interval 1030. An STC gain profile 1040 shows that from a time $t_0$ to a time $t_1$, a gain of the receiver (e.g., a combined gain of the RF amplifier 920 and the LNA 950) is a first gain 1041, from the time $t_1$ to a time $t_2$, the gain of the receiver is an increasing (here, a linearly increasing gain 1050) to a second gain 1042, and after the time $t_2$, remains at the second gain 1042. An STC profile may be specified in terms of a start time, a stop time, and corresponding gains. For example, the STC gain profile 1040 may be specified by a start time (e.g., the time $t_1$), a stop time (e.g., the time $t_2$), and one or more indications of the time-varying gain. The time-varying gain may, for example, be indicated by a gain formula, or by a gain at the start time, a gain at the stop time, and a formula for the gain between the start and stop times. The gain formula may, for example, be a gain slope for a linearly-varying gain or a logarithmic formula with indicated scale parameters, or another formula (e.g., a piecewise indication of discrete gain levels and corresponding time intervals, or a combination of varying gains (e.g., linear and logarithmic, e.g., linear in one or more time intervals and logarithmic in one or more other time intervals)). Other STC profiles may be used. For example, other variations of increasing gain, e.g., a non-linear gain (e.g., a logarithmically-increasing gain) such as a non-linear increasing gain 1060, may be used.

STC may be used to detect target objects at greater distances, e.g., with gain applied to a received signal by a receiver being adapted in time domain to avoid exceeding the receiver dynamic range. STC (a.k.a., swept-gain control, amplifier gain time control, and attenuation time control) may be used to control receiver gain so that receiver dynamic range is set properly to detect both short-range and long-range targets. For example, control amplifier gains (before or after an IF stage) may be set low right after a sensing signal pulse is transmitted and then gradually increased (e.g., linearly, logarithmically, etc.) over time.

Although STC may help enhance detecting longer targets, STC has some challenges/disadvantages. For example, an STC profile (i.e., gain as a function of time), to be effective, may depend on a deployment environment, an application for the sensing using the STC, and expected ranges of intended targets. Even for the same application, there may be different clutter profiles which may result in different STC profiles being desired. Linearly-varying gain with time and logarithmically-varying gain with time are examples of STC profile gain variations, but other gain variations may be used. A desired gain variation may depend, for example, on knowledge of target distance and clutter profile. A well-performing STC profile may depend on a clutter profile and nature and may be different for different applications. A well-performing STC profile (e.g., determining, e.g., selecting, of an STC profile that will provide accurate results) may require knowledge of close clutter sources and their modeling. Consequently, STC is a good candidate for air traffic control (ATC) in which most targets are relatively at long ranges/distances, and objects at short distances/ranges are not of interest. As another example, STC may cause close targets to be mis-detected/mis-identified. As another example, the use of STC for NR RF sensing is challenging. For example, the UE (as a sensing receiving node/entity) may work in broad environment and under broad clutter settings/options, and STC may or may not be recommended depending on the intended target range and type of expected clutter at short ranges. If STC is used, the UE may not know the proper STC profile to apply while conducting sensing, e.g., because clutter information may be broad and different for different sites.

As discussed herein, a network entity, e.g., an LMF or an SMF (Sensing Management Function) may be configured to send STC configuration information (e.g., STC-related configurations) for a UE. The STC configuration information may include one or more STC profile configurations, e.g., recommended STC settings for one or more STC profiles for the UE to use to detect a target. The UE may use one or more recommended STC settings (e.g., of an instructed STC profile or of an STC profile selected by the UE from multiple recommended STC profiles) to perform sensing. The UE may report sensing measurements and sensing outcomes. The STC configuration information may include: an indication of when the UE should use STC and/or when the UE should not use STC, one or more recommended STC profiles (e.g., gain settings as a function of time), and/or information (e.g., clutter information) that may be used to determine (e.g., by the UE) STC profile settings (e.g., by selecting from among available STC profiles).

Also as discussed herein, a UE may share with a network entity (e.g., an SMF) STC configuration information such as one or more recommended STC settings. For example, if a UE determines that one or more STC settings yielded accurate sensing results (e.g., sensing results meeting one or more accuracy criteria, e.g., exceeding one or more respective accuracy thresholds), then the UE may share the STC setting(s) and one or more corresponding conditions (e.g., a location of the UE, a clutter profile corresponding to the location of the UE, and/or target type(s), etc.). The network entity may use the shared STC configuration information to configure the reporting UE for STC implementation for RF sensing, e.g., by instructing the UE to use one or more of the reported STC setting(s). Also or alternatively, the network entity may share the shared STC configuration information with one or more UEs other than the reporting UE, and/or may configure one or more UEs other than the reporting UE to implement STC for RF sensing using one or more of the shared STC settings, e.g., corresponding to one or more of the one or more shared conditions, if any.

Figure 11:
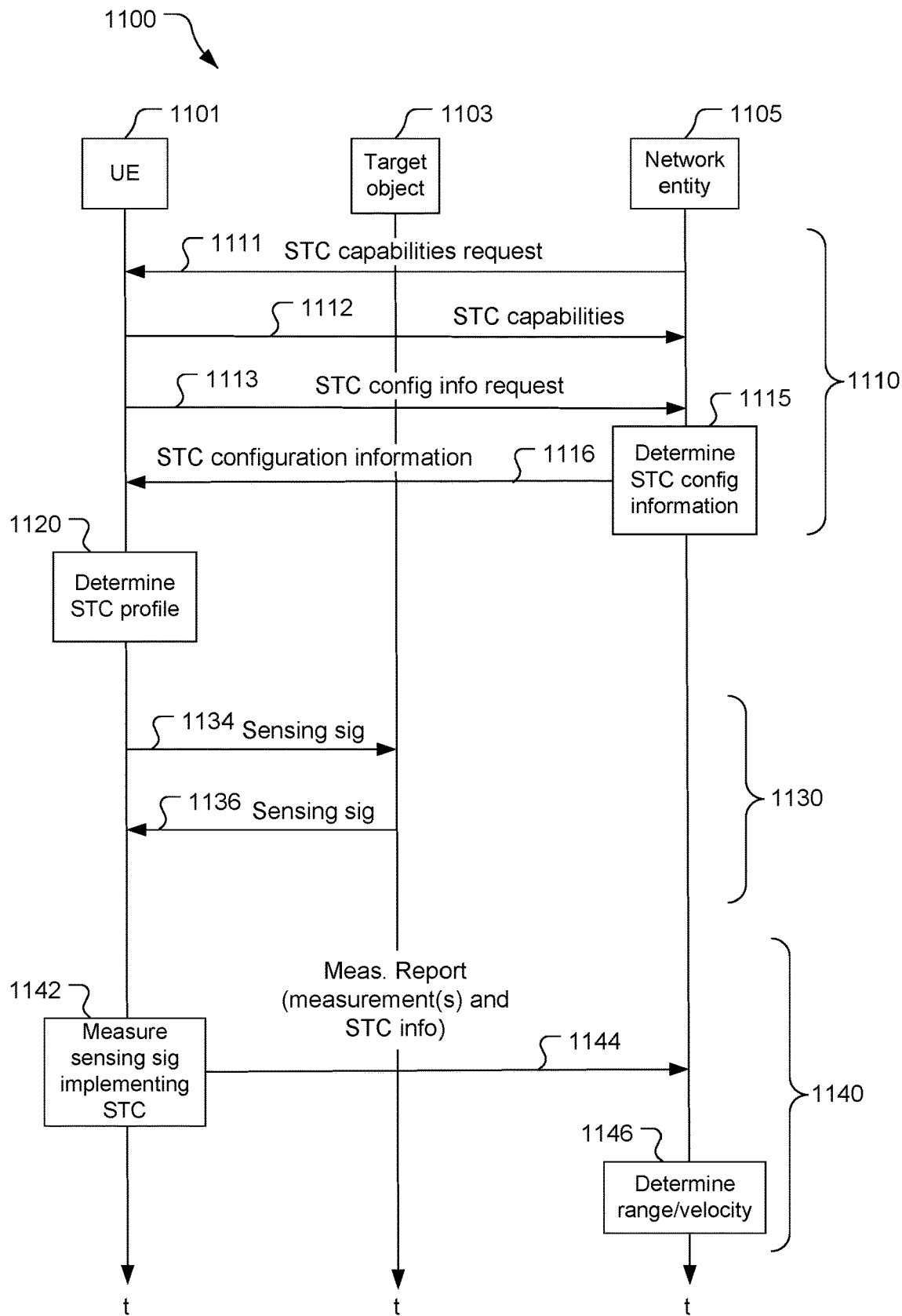
FIG. 11 is a signal and processing flow diagram for determining range to and/or velocity of a target object using radio frequency sensing with sensitivity time control.

Referring to FIG. 11, with further reference to FIGS. 1-10, a processing and signal flow 1100 for determining target object range and/or velocity using RF scheduling with STC includes the stages shown. The flow 1100 is an example of interaction between a UE 1101, a target object 1103, and a network entity 1105. The UE 1101 may be an example of the UE 500. The network entity 1105 may be an example of the network entity 600. Other flows may be used. For example, one or more stages may be added to the flow 1100, rearranged, and/or removed from the flow 1100. For example, stage 1110 may be omitted. As another example, one or more of messages 1111, 1112, 1113 may be omitted (e.g., not produced and/or not transmitted). As another example, sub-stage 1115 may be omitted, e.g., based on the message 1113 not being transmitted. As another example, a sensing signal may be transmitted by a signal source other than the UE 1101 in addition to or instead of a sensing signal being transmitted by the UE 1101.

At stage 1110, STC capabilities of the UE 1101 may be requested by and/or provided to the network entity 1105. The network entity 1105, e.g., the STC unit 650, may transmit (e.g., via the transceiver 620) an STC capabilities request message 1111 to the UE 1101. The message 1111 may request the capability(ies) of the UE 1001 regarding implementation of STC, e.g., whether the UE 1101 is configured to implement STC, what STC profile(s) the UE 1101 is configured to implement, the setting(s) of any STC profile(s) that the UE 1101 is configured to implement, one or more conditions (e.g., frequency, clutter profile, target distance, etc.) corresponding to any STC profile(s) that the UE 1101 is configured to implement. The UE 1101, e.g., the capability unit 550, may transmit an STC capabilities message 1112 including one or more of the requested STC capabilities and/or one or more other STC capabilities of the UE 1101. The UE 1101 may transmit the STC capabilities message 1112 in response to the STC capabilities request message 1111 or independent of any request for the STC capabilities of the UE 1101 (e.g., without being requested for the STC capabilities or without regard to a received request for the STC capabilities). The UE 1101 may transmit the STC capabilities message 1112 as part of an LPP capability exchange procedure, or as part of a sensing capability transfer procedure developed for STC capability transfer.

Referring also to FIG. 12, an STC capabilities table 1200 is an example of content of the STC capabilities message 1112. The table 1200 includes an STC capability field 1210, an STC profile(s) available field 1220, an available STC profile(s) field 1230, and a conditional STC applicability field 1240. The table 1200 is an example, and other message content (e.g., with one or more of the fields 1210, 1220, 1230, 1240 omitted, and/or with different formats of content) may be used. The STC capability field 1210 indicates whether the UE 1101 is configured to implement STC for RF sensing. The STC profile(s) available field 1220 indicates whether the UE 1101 has any stored STC profiles that the UE 1101 can implement for RF sensing. The available STC profile(s) field 1230 indicates the STC profile(s), if any, stored by the UE 1101 (e.g., in the memory 530). Indication (s) of the stored profile(s) may, for each STC profile, be in the form of one or more STC profile settings (e.g., ParamSet1, Paramset2 as shown) and/or in the form of a code corresponding to the STC profile (e.g., STCcode1 as shown) that correspond to a set of STC settings as known by both the network entity 1105 and the UE 1101. The conditional STC applicability field 1240 indicates whether the UE 1101 is configured to apply the STC profile(s) selectively based on one or more conditions, e.g., frequency, direction (e.g., corresponding to an antenna beam and/or antenna beamwidth) of receipt of an RF sensing signal, received signal polarization, and/or received signal pulse. For example, the UE 1101 may have multiple receive RF chains and may process the received signal with different STC profiles applied by the different chains. As another example, the UE 1101 may apply different STC profiles to different pulses of a signal. Either of these examples may be implemented to provide diversity to a target and/or to allow detection of multiple targets where a single STC profile may be inadequate for detecting all of the targets. One or more condition(s) indicated by the field 1240 may be provided for each available STC profile indicated in the field 1230, and/or the same set (with a "set" as used herein including at least one member) of one or more conditions indicated in the field 1240 may be provided for multiple STC profiles indicated in the field 1230, or the same set of conditions indicated in the field 1240 may be provided for all of the STC profiles indicated in the field 1230. Alternatively, the field 1240 may indicate generally that the UE 1101 is capable of selectively applying STC profiles based on one or more conditions without specifically indicating sets of conditions corresponding to respective STC profiles.

Also or alternatively at stage 1110, STC configuration information may be requested by and/or provided to the UE 1101. The UE 1101, e.g., the RF sensing unit 560, may transmit an STC configuration information request message 1113 to the network entity 1105. The message 1113 may request one or more STC profiles and/or STC configuration information that the UE 1101 may use to determine one or more STC profiles to apply when receiving an RF sensing and performing sensing measurements for one or more target objects, e.g., the target object 1103. The message 1113 may request information for one or more STC profiles corresponding to one or more criteria, e.g., RF sensing signal frequency band, RF sensing signal polarization, etc. At sub-stage 1115, the network entity 1105 (e.g., the STC unit 650, e.g., of an SMF) may determine one or more STC profiles to be transmitted to the UE 1101. The network entity 1104, e.g., the STC unit 650, may produce one or more STC profiles, e.g., based on STC profile information reported to the network entity 1105 by the UE 1101 and/or one or more other UEs, based on one or more clutter profiles near the UE 1101 (or between the UE and one or more target objects), one or more distances to one or more target objects, and/or one or more STC capabilities indicated by the UE 1101 in the STC capabilities message 1112. The network entity 1105 may send an STC configuration information message 1116 to the UE 1101 indicating STC configuration information for the UE 1101 to use to determine (e.g., derive or select) an STC profile to implement for RF sensing for the target object 1103. The message 1116 may be transmitted in any of a variety of ways. The network entity 1105 may transmit the message 1116, for example, as part of an LPP assistance data exchange procedure, a location broadcasting procedure, and/or a location request procedure. Also or alternatively, the network entity 1105 may transmit the message 1116, for example, as part of an assistance data provision procedure developed for RF sensing, an RF sensing broadcasting procedure, and/or an RF sensing request procedure.

Referring also to FIG. 13, an STC configuration information table 1300 is an example of content of the STC configuration information message 1116. The table 1300 includes an STC profile indication field 1310, an STC consideration(s) field 1320, and STC profile consideration(s) field 1330, and an STC profile prioritization rule(s) field 1340. The table 1300 is an example, and other message content (e.g., with one or more of the fields 1310, 1320, 1330, 1340 omitted, and/or with different formats of content) may be used.

The STC profile indication field 1310 may indicate one or more recommended STC profiles for the UE 1101 to use to implement STC RF sensing. The STC profile indication field 1310 may indicate one or more STC profiles, e.g., a parameter set and/or a coded profile indication. The coded profile indication may be a well-known (e.g., globally-known or network-wide-known) code for an STC profile, or may be a code for a particular UE, e.g., indicating an STC profile of a set of STC profiles indicated by the UE 1101 as being supported by the UE 1101 (e.g., STC profile 1 or STC profile 2). Each STC profile indication may include a corresponding granularity, e.g., a frequency range, a received sensing signal direction (e.g., relative to a global coordinate system), a sensing signal pulse/processing repetition interval, a sensing signal polarization, etc.). The granularity indicates one or more parameters for implementation of the STC profile. The STC profile indication also includes a profile description (e.g., explicitly with a set of one or more parameters, or implicitly with a coded indication, e.g., a profile code number corresponding to a known set of parameters (including values of the parameters)). The profile description parameters may, for example, include a start time, stop (end) time, and slope of gain variation for a linearly-varying gain STC profile. As another example, the profile description parameters may include a start time, and end time, and a scale for a logarithmically-varying gain STC profile. As another example, the profile description may include a piece-wise gain function with different discrete gain values and corresponding time intervals. The STC profile indication field 1310 may indicate that, if the UE 1101 is capable of applying STC, to apply a recommended STC profile indicated by the STC profile indication field 1310 as instructed by the network entity 1105 or as chosen by the UE 1101.

The STC consideration(s) field 1320 may indicate information from which the UE 1101 may determine (e.g., derive or select) an STC profile to implement and/or from which the UE 1101 may determine when to report RF sensing measurements. For example, the STC consideration(s) field 1320 may indicate one or more clutter profiles and/or other information for the UE 1101 to use to determine an STC profile to implement to sense the target object 1103. For example, the STC consideration(s) may indicate one or more characteristics of clutter between the UE 1101 and the target object 1103, e.g., based on a coarse location of the UE 1101. The STC consideration(s) may include different ranges (distances) from the UE 1101 with a respective clutter indication (e.g., clutter reflectivity) for each of the different ranges. The STC consideration(s) may include a probability distribution indicating a short-range clutter radar cross-section (RCS). As another example, the STC consideration (s) field 1320 may indicate one or more aspects of STC-enabled measurements. For example, the STC consideration (s) field 1320 may indicate periodic reporting (and if so, a period for the reporting), aperiodic reporting (to be triggered by a report request sent by the network entity 1105 to the UE 1101), or event-triggered reporting (and if so, one or more events to trigger the reporting). The STC consideration(s) field 1320 may indicate for the UE 1101, if the UE 1101 is configured to determine (e.g., derive) an STC profile, to use the indicated STC consideration(s) to determine the STC profile to apply.

The STC profile condition(s) field 1330 may indicate one or more conditions to be met for the UE 1101 to apply an STC profile for RF sensing. For example, the STC profile condition(s) field 1330 may indicate a geographic area for the UE 1101 to be in to apply a corresponding STC profile. Also or alternatively, the STC profile condition(s) field 1330 may indicate one or more receive signal KPI (Key Performance Indicators) thresholds of a received sensing signal to meet in order to apply a respective STC profile. Example KPI thresholds may include, for example, an RSSI threshold, an RSRP threshold, a SINR (Signal-to-Interference-plus-Noise Ratio) threshold, a dynamic range threshold, etc.

The STC profile prioritization rule(s) field 1340 may indicate one or more rules for the UE 1101 to use to prioritize which of multiple STC profiles to apply for RF sensing. For example, the STC prioritization rule(s) field 1340 may indicate which STC profile to use for a specific geographic area (e.g., ParamSet1 for Area2 as shown in FIG. 13). Also or alternatively, the STC profile condition(s) field 1330 may indicate one or more receive signal KPI (Key Performance Indicators) thresholds of a received sensing signal to meet in order to apply a respective STC profile. For example, a priority of STC profiles for the same geographic area corresponding to different KPIs may be indicated (e.g., STCcode1 for Area1 and RSSI above an RSSI threshold of RSSI1, and ParamSet2 for Area1 with an RSSI above an RSSI threshold of RSSI2 as shown in FIG. 13).

Referring in particular again to FIG. 11, at stage 1120, the UE 1101, e.g., the RF sensing unit 560, may determine an STC profile to implement for RF sensing. For example, the UE 1101 may determine the STC profile to implement by reading an instructed STC profile from the message 1116. As another example, the UE 1101 may determine the STC profile to implement by selecting one of multiple recommended STC profiles in the message 1116, e.g., by evaluating clutter information and/or by evaluating prioritization rules and corresponding parameter/condition values (e.g., an area in which the UE 1101 is located, a KPI of a received signal, etc.). As another example, the UE 1101 may determine the STC profile to implement by selecting from multiple STC profiles stored in the memory 530, e.g., based on clutter information and/or based on prioritization rules provided by the network entity 1105, or stored in the memory 530, and corresponding parameter/condition values. As another example, the UE 1101 may determine the STC profile to implement by deriving an STC profile based on information (e.g., clutter profile information) in the message 1116 and/or measured by the UE 1101. For example, the gain of an STC profile may be inversely related to an expected clutter power reflection, clutter reflectivity, or clutter radar cross-section. STC profile information stored in the memory 530 may be established by any of a variety of entities, e.g., a maker of the UE 1101 and/or a maker of an RF sensing chip or processor chip. The STC profile information may be established for various conditions, e.g., specific locations.

At stage 1130, the UE 1101 may perform sensing signal transmission (e.g., one or more sensing signal transmissions) and the UE 1101 and the network entity 1105 may perform non-sensing signal transfer (e.g., one or more transmission (s) and/or one or more reception(s)). The UE 1101 may transmit a sensing signal 1134 (and/or another sensing signal source (e.g., another UE, the network entity 1105 or another network entity (e.g., a gNB, a TRP, etc.)) may transmit another sensing signal). The sensing signal transmission may involve implementing an STC profile determined at stage 1120. A reflected sensing signal 1136 (being a reflection of the sensing signal 1134 or a reflection of another sensing signal) may be received by the UE 1101.

At stage 1140, the UE 1101 may measure the reflected sensing signal 1136 and possibly report one or more respective measurements and/or processed measurements. At sub-stage 1142, the UE 1101 may measure the reflected sensing signal 1136 and may transmit, to the network entity 1105, a measurement report 1144 that may include one or more raw measurements and/or one or more processed measurements, e.g., one or more object ranges and/or one or more object directions and/or one or more object velocities. Sensing signal transmission (and reception and measurement) may also occur before the determination of the STC profile (e.g., as part of evaluating one or more STC profile conditions and/or as part of evaluating STC profile prioritization). Also or alternatively, at sub-stage 1146, the network entity 1105 (e.g., the RF sensing unit 660) may determine one or more target object ranges and/or one or more target object velocities similar to sub-stage 1142, e.g., based on information in the measurement report 1144. The measurement report 1144 may indicate whether an STC profile was applied to determine reported RF sensing measurement information. The measurement report 1144 may indicate an STC profile (e.g., one or more STC settings) that was applied and that was effective (e.g., yielded RF sensing of desired accuracy (e.g., yielded one or more RF sensing measurements (raw and/or processed) meeting desired accuracy). The measurement report 1144 may indicate an effectiveness of the indicated STC profile, e.g., indicating one or more KPIs (e.g., measurement accuracy) of RF sensing using the indicated STC profile. The measurement report 1144 may indicate one or more conditions (e.g., area, clutter profile) corresponding to the RF sensing with the indicated effective STC profile applied. The network entity 1105 may use, e.g., at sub-stage 1115, information regarding an effective STC profile and condition(s) under which the STC profile was effective to determine STC configuration information, e.g., one or more STC profiles, one or more STC profile conditions, one or more STC prioritization rules, etc. that the network entity 1105 may send to the UE 1101 and/or to another UE for use in RF sensing while applying STC. In this way, STC profile information may be crowdsourced by UEs for those UEs and/or other UEs.

The network entity 1105, e.g., the sensing unit 660, may transmit one or more determined ranges and/or one or more determined velocities. For example, the network entity 1105 may transmit the range(s) and/or the velocity(ies) to the UE 1101, to another UE, to another network entity, etc.

Figure 14:
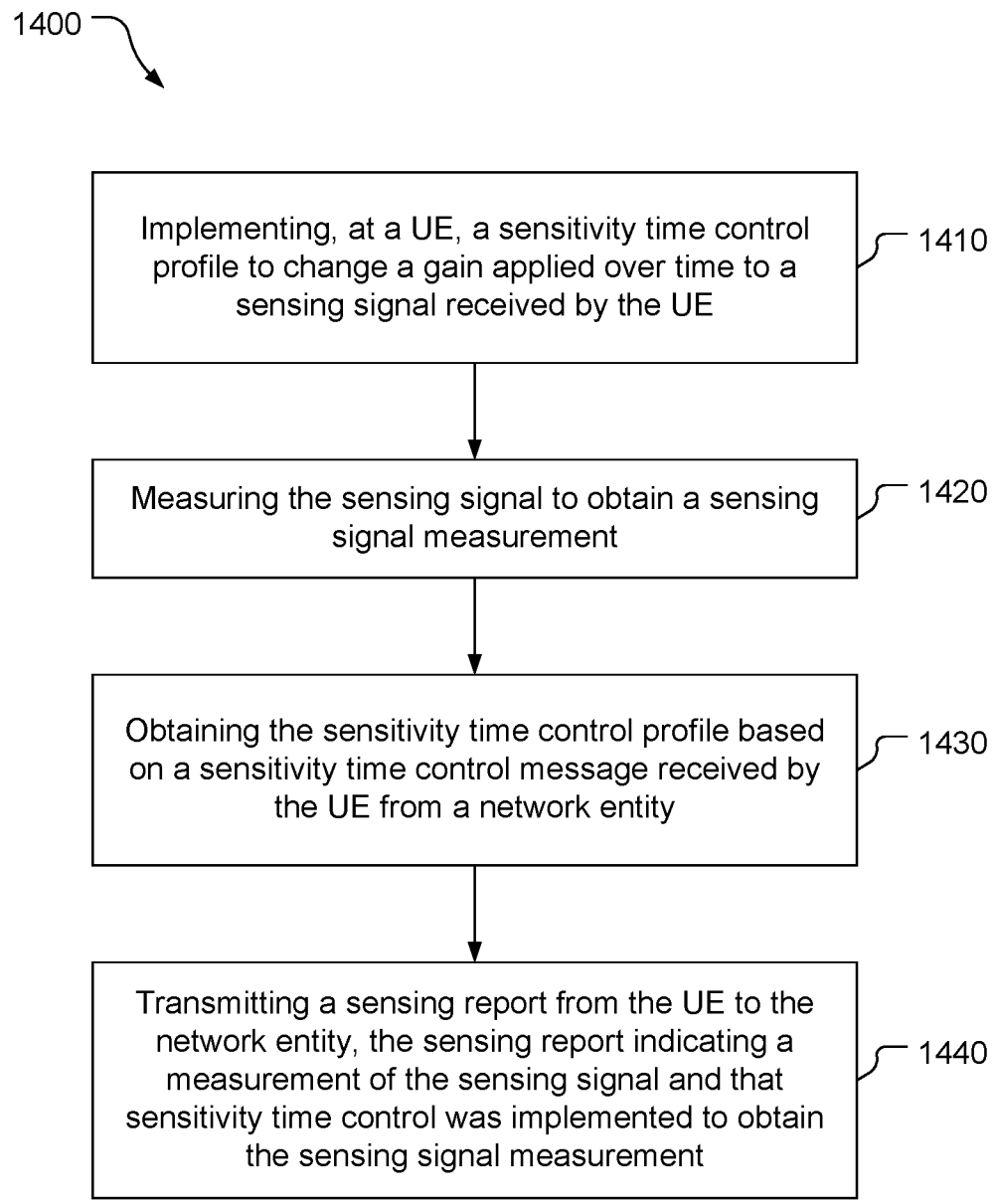
FIG. 14 is a block flow diagram of a sensing method.

Referring to FIG. 14, with further reference to FIGS. 1-13, a sensing method 1400 includes the stages shown. The method 1400 is, however, an example only and not limiting. The method 1400 may be altered, e.g., by having one or more stages added, removed, rearranged, combined, performed concurrently, and/or having one or more single stages split into multiple stages.

At stage 1410, the method 1400 includes implementing, at a UE, a sensitivity time control profile to change a gain applied over time to a sensing signal received by the UE. For example, at sub-stage 1142, the RF sensing unit 560 of the UE 1101 may implement STC (e.g., a sensing profile as shown in FIG. 10) to the sensing signal 1136. The processor 510, possibly in combination with the memory 530, in combination with the transceiver 520 (e.g., the wireless receiver 244 (e.g., the receiver 900) and the antenna 246) may comprise means for implementing an STC profile.

At stage 1420, the method 1400 includes measuring the sensing signal to obtain a sensing signal measurement. For example, at sub-stage 1142, the RF sensing unit 560 of the UE 1101 may measure the sensing signal 1136 with STC applied. The processor 510, possibly in combination with the memory 530, may comprise means for measuring the sensing signal.

The method 1400 includes an optional stage 1430 and/or an optional stage 1440. Optionally, at stage 1430, the method 1400 includes obtaining the sensitivity time control profile based on a sensitivity time control message received by the UE from a network entity. For example, the UE 1101, e.g., the RF sensing unit 560, may receive the STC profile in the STC configuration information message 1116 or may select the STC profile based on information (e.g., prioritization information and/or condition information) in the message 1116 or may derive the profile based on information (e.g., clutter information and/or condition information) in the message 1116. The processor 510, possibly in combination with the memory 530, in combination with the transceiver 520 (e.g., the wireless receiver 244 and the antenna 246) may comprise means for obtaining the STC profile based on an STC message. Optionally, at stage 1440, the method 1400 includes transmitting a sensing report from the UE to the network entity, the sensing report indicating a measurement of the sensing signal and that sensitivity time control was implemented to obtain the sensing signal measurement. For example, at sub-stage 1142, the UE 1101 (e.g., the RF sensing unit 560) may transmit the measurement report 1144 indicating an RF sensing measurement (e.g., one or more RF sensing measurements) and indicating (explicitly or implicitly (e.g., by indicating the STC profile applied)) that STC was used to obtain the RF sensing measurement. The processor 510, possibly in combination with the memory 530, in combination with the transceiver 520 (e.g., the wireless transmitter 242 and the antenna 246) may comprise means for transmitting the sensing report.

Implementations of the method 1400 may include one or more of the following features. In an example implementation, the method 1400 comprises obtaining the sensitivity time control profile based on the sensitivity time control message, with the sensitivity time control message indicating at least one of: the sensitivity time control profile, a clutter profile corresponding to a location of the UE, or one or more criteria to be met for the UE to implement sensitivity time control. For example, the STC message may include an STC profile (e.g., in the field 1310), a clutter profile (e.g., in the field 1320), and/or one or more conditions (e.g., in the field 1330). In a further example implementation, the sensitivity time control message indicates the one or more criteria to be met for the UE to implement sensitivity time control, and the one or more criteria to be met for the UE to implement sensitivity time control include at least one of: an area, a signal strength of the sensing signal, a signal-to-noise ratio of the sensing signal, a signal-to-interference-plus-noise ratio of the sensing signal, or a dynamic range of the sensing signal. For example, the STC message may include one or more criteria (e.g., area of UE location, sensing signal RSSI, sensing signal RSRP, sensing signal SINR, sensing signal dynamic range, etc.) of the STC profile (e.g., in the field 1330). In another further example implementation, the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile. For example, the STC message may include granularity parameters (e.g., in the field 1310) for the STC profile. In another further example implementation, the sensitivity time control profile is a first sensitivity time control profile, and the sensitivity time control message indicates the first sensitivity time control profile and a second time control profile, and indicates prioritization information, where implementing the first sensitivity time control profile comprises implementing the first sensitivity time control profile based on the prioritization information.

Also or alternatively, implementations of the method 1400 may include one or more of the following features. In an example implementation, the method 1400 includes transmitting the sensing report to the network entity, with the sensing report indicating that the sensitivity time control profile was implemented by the UE to obtain the sensing signal measurement and indicating one or more conditions corresponding to implementation of the sensitivity time control profile. For example, the sensing report may include one or more KPIs indicating quality sensing signal measurement and the condition(s) may include frequency, UE location, and/or clutter profile of the UE location. In another example implementation, the method 1400 further includes transmitting, from the UE to the network entity, a capability message indicating a first capability of the UE to implement sensitivity time control to obtain a sensing signal measurement. For example, the UE 1101 (e.g., the capability unit 550), may transmit the STC capabilities message indicating a capability to implement STC. For example, the indication may be an explicit indication, e.g., in the field 1210, and/or an implicit indication, e.g., an indication that one or more STC profiles are available (e.g., in the field 1220) and/or an indication of one or more available STC profiles (e.g., in the field 1230). The processor 510, possibly in combination with the memory 530, in combination with the transceiver 520 (e.g., the wireless transmitter 242 and the antenna 246) may comprise means for transmitting the capability message. In a further example implementation, the capability message indicates a second capability of the UE to implement different sensitivity time control profiles based on at least one of sensing signal frequency, sensing signal direction, sensing signal polarization, or sensing signal pulse configuration. For example, the capability message may include one or more parameters as shown in the field 1240.

Figure 15:
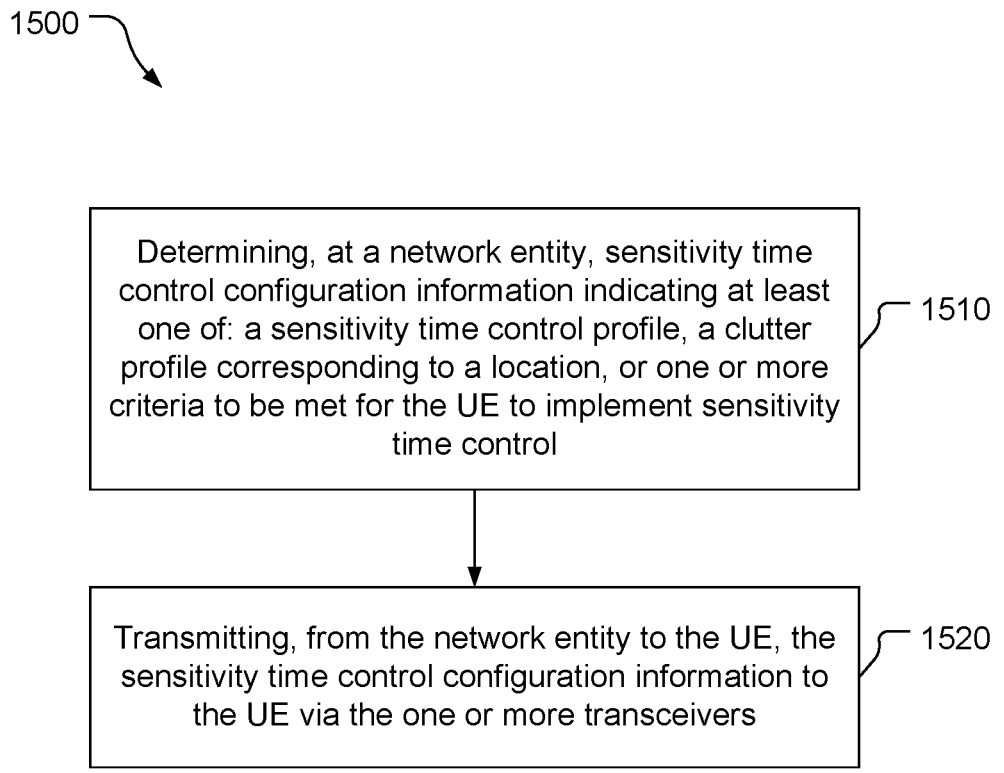
FIG. 15 is a block flow diagram of a method for supporting sensitivity time control for sensing by a user equipment.

Referring to FIG. 15, with further reference to FIGS. 1-13, a method 1500 for supporting sensitivity time control for sensing by a UE includes the stages shown. The method 1500 is, however, an example only and not limiting. The method 1500 may be altered, e.g., by having one or more stages added, removed, rearranged, combined, performed concurrently, and/or having one or more single stages split into multiple stages.

At stage 1510, the method 1500 includes determining, at a network entity, sensitivity time control configuration information indicating at least one of: a sensitivity time control profile, a clutter profile corresponding to a location, or one or more criteria to be met for the UE to implement sensitivity time control. For example, at sub-stage 1115 the network entity 1105, e.g., the STC unit 650, may determine STC configuration information including an STC profile, a clutter profile, and/or one or more conditions for implementing the STC profile. The processor 610, possibly in combination with the memory 630, possibly in combination with the transceiver 620 (e.g., the wireless receiver 444 and the antenna 446, and/or the wired receiver 454, or the wireless receiver 344 and the antenna 346, and/or the wired receiver 354) may comprise means for determining the STC configuration information.

At stage 1520, the method 1500 includes transmitting, from the network entity to the UE, the sensitivity time control configuration information to the UE via the one or more transceivers. For example, at sub-stage 1115 the network entity 1105, e.g., the STC unit 650, may transmit the STC configuration information message 1116 to the UE 1101. The processor 610, possibly in combination with the memory 630, possibly in combination with the transceiver 620 (e.g., the wireless transmitter 442 and the antenna 446, and/or the wired transmitter 452, or the wireless transmitter 342 and the antenna 346, and/or the wired transmitter 352) may comprise means for transmitting the STC configuration information.

Implementations of the method 1500 may include one or more of the following features. In an example implementation, the sensitivity time control configuration information indicates the one or more criteria to be met for the UE to implement sensitivity time control, and the one or more criteria to be met for the UE to implement sensitivity time control include at least one of: an area, a signal strength of a sensing signal, a signal-to-noise ratio of the sensing signal, a signal-to-interference-plus-noise ratio of the sensing signal, or a dynamic range of the sensing signal. For example, an STC configuration information message may include one or more conditions indicated in the field 1330. In another example implementation, the sensitivity time control configuration information indicates the sensitivity time control profile, and includes at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile. For example, an STC configuration information message may include an STC profile and one or more granularity parameter for the STC profile, e.g., as shown in the field 1310. In another example implementation, the sensitivity time control profile is a first sensitivity time control profile, where the sensitivity time control configuration information indicates the first sensitivity time control profile and a second time control profile, and indicates prioritization information indicating how to determine which of the first sensitivity time control profile and the second time control profile for the UE to use to measure a sensing signal. For example, an STC configuration message may include multiple STC profiles and information to determine a priority for the STC profiles, e.g., as shown in the field 1340 of the table 1300. In another example implementation, the method 1500 further comprises receiving, by the network entity from a second UE, a sensitivity time control report indicating the sensitivity time control profile and one or more operational conditions corresponding to the sensitivity time control profile, and the method 1500 further comprises at least one of: transmitting, from the network entity to the first UE based on the one or more operational conditions being met by the first UE, the sensitivity time control configuration information indicating the sensitivity time control profile; or transmitting, from the network entity to the first UE, the sensitivity time control configuration information indicating the sensitivity time control profile and the one or more operational conditions corresponding to the sensitivity time control profile. For example, the network entity 1105, e.g., the STC unit 650, may receive the measurement report 1144 from the UE 1101, indicating an STC profile used by the UE 1101 to measure an RF sensing signal and one or more operational conditions (e.g., an location of the UE 1101, a clutter profile during the sensing, etc.). The network entity 1105, e.g., the STC unit 650, may transmit the STC configuration information message 1116 with the STC profile from the report 1144 to the UE 1101 (and/or to another UE 1101) based on the operational condition(s) being met (e.g., the UE 1101 being in the area indicated in the report 1144). Also or alternatively, the network entity 1105, e.g., the STC unit 650, may transmit the STC configuration information message 1116 with the STC profile from the report 1144 and the operational condition(s) to the UE 1101 and/or to another UE, e.g., such that the UE 1101 and/or the other UE may determine to use the indicated STC profile if the operational condition(s) is(are) met, e.g., when the UE 1101 is in the indicated area. The processor 610, possibly in combination with the memory 630, possibly in combination with the transceiver 620 (e.g., the wireless transmitter 442 and the antenna 446, and/or the wired transmitter 452, or the wireless transmitter 342 and the antenna 346, and/or the wired transmitter 352) may comprise means for transmitting the sensitivity time control configuration information indicating the sensitivity time control profile and/or may comprise means for transmitting the sensitivity time control configuration information indicating the sensitivity time control profile and the one or more operational conditions corresponding to the sensitivity time control profile.

Implementation Examples

Implementation examples are provided in the following numbered clauses.

Clause 1. A UE (user equipment) comprising:
one or more memories;
one or more transceivers configured to receive a sensing signal; and
one or more processors, communicatively coupled to the one or more memories and the one or more transceivers, configured to:
implement a sensitivity time control profile to change a gain applied over time to the sensing signal by the one or more transceivers; and measure the sensing signal to obtain a sensing signal measurement;
wherein the one or more processors are at least one of:
configured to obtain the sensitivity time control profile based on a sensitivity time control message received from a network entity via the one or more transceivers; or
configured to transmit a sensing report to the network entity via the one or more transceivers, the sensing report indicating a measurement of the sensing signal and whether sensitivity time control was implemented to obtain the sensing signal measurement.

Clause 2. The UE of claim 1, wherein the one or more processors are configured to obtain the sensitivity time control profile based on the sensitivity time control message with the sensitivity time control message indicating at least one of: the sensitivity time control profile, a clutter profile corresponding to a location of the UE, or one or more criteria to be met for the UE to implement sensitivity time control.

Clause 3. The UE of claim 2, wherein the one or more processors are configured to obtain the sensitivity time control profile based on the sensitivity time control message, with the sensitivity time control message indicating the one or more criteria to be met for the UE to implement sensitivity time control, and wherein the one or more criteria to be met for the UE to implement sensitivity time control include at least one of: an area, a signal strength of the sensing signal, a signal-to-noise ratio of the sensing signal, a signal-to-interference-plus-noise ratio of the sensing signal, or a dynamic range of the sensing signal.

Clause 4. The UE of claim 2, wherein the one or more processors are configured to obtain the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 5. The UE of claim 2, wherein the sensitivity time control profile is a first sensitivity time control profile, wherein the one or more processors are configured to obtain the sensitivity time control profile based on the sensitivity time control message, with the sensitivity time control message indicating the first sensitivity time control profile and a second time control profile, and indicating prioritization information, and wherein the one or more processors are configured to determine to implement the first sensitivity time control profile based on the prioritization information.

Clause 6. The UE of claim 1, wherein the one or more processors are configured to transmit the sensing report to the network entity, with the sensing report indicating that the sensitivity time control profile was implemented by the one or more processors to obtain the sensing signal measurement and indicating one or more conditions corresponding to implementation of the sensitivity time control profile.

Clause 7. The UE of claim 1, wherein the one or more processors are further configured to transmit, to the network entity via the one or more transceivers, a capability message indicating a first capability of the UE to implement sensitivity time control to obtain a sensing signal measurement.

Clause 8. The UE of claim 7, wherein the capability message indicates a second capability of the UE to implement different sensitivity time control profiles based on at least one of sensing signal frequency, sensing signal direction, sensing signal polarization, or sensing signal pulse configuration.

Clause 9. A sensing method comprising:
implementing, at a UE (user equipment), a sensitivity time control profile to change a gain applied over time to a sensing signal received by the UE; and measuring the sensing signal to obtain a sensing signal measurement;
wherein the method comprises at least one of:
obtaining the sensitivity time control profile based on a sensitivity time control message received by the UE from a network entity; or
transmitting a sensing report from the UE to the network entity, the sensing report indicating a measurement of the sensing signal and that sensitivity time control was implemented to obtain the sensing signal measurement.

Clause 10. The sensing method of claim 9, wherein the method comprises obtaining the sensitivity time control profile based on the sensitivity time control message, with the sensitivity time control message indicating at least one of: the sensitivity time control profile, a clutter profile corresponding to a location of the UE, or one or more criteria to be met for the UE to implement sensitivity time control.

Clause 11. The sensing method of claim 10, wherein the method comprises obtaining the sensitivity time control profile based on the sensitivity time control message, with the sensitivity time control message indicating the one or more criteria to be met for the UE to implement sensitivity time control, and wherein the one or more criteria to be met for the UE to implement sensitivity time control include at least one of: an area, a signal strength of the sensing signal, a signal-to-noise ratio of the sensing signal, a signal-to-interference-plus-noise ratio of the sensing signal, or a dynamic range of the sensing signal.

Clause 12. The sensing method of claim 10, wherein the method comprises obtaining the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 13. The sensing method of claim 10, wherein the sensitivity time control profile is a first sensitivity time control profile, wherein the method comprises obtaining the sensitivity time control profile based on the sensitivity time control message, with the sensitivity time control message indicating the first sensitivity time control profile and a second time control profile, and indicating prioritization information, and wherein implementing the first sensitivity time control profile comprises implementing the first sensitivity time control profile based on the prioritization information.

Clause 14. The sensing method of claim 9, wherein the method comprises transmitting the sensing report to the network entity, with the sensing report indicating that the sensitivity time control profile was implemented by the UE to obtain the sensing signal measurement and indicating one or more conditions corresponding to implementation of the sensitivity time control profile.

Clause 15. The sensing method of claim 9, further comprising transmitting, from the UE to the network entity, a capability message indicating a first capability of the UE to implement sensitivity time control to obtain a sensing signal measurement.

Clause 16. The sensing method of claim 15, wherein the capability message indicates a second capability of the UE to implement different sensitivity time control profiles based on at least one of sensing signal frequency, sensing signal direction, sensing signal polarization, or sensing signal pulse configuration.

Clause 17. A UE (user equipment) comprising:
means for implementing a sensitivity time control profile to change a gain applied over time to a sensing signal received by the UE; and
means for measuring the sensing signal to obtain a sensing signal measurement;
wherein the UE further comprises at least one of:
means for obtaining the sensitivity time control profile based on a sensitivity time control message received by the UE from a network entity; or
means for transmitting a sensing report from the UE to the network entity, the sensing report indicating a measurement of the sensing signal and that sensitivity time control was implemented to obtain the sensing signal measurement.

Clause 18. The UE of claim 17, wherein the UE comprises the means for obtaining the sensitivity time control profile based on the sensitivity time control message, with the sensitivity time control message indicating at least one of: the sensitivity time control profile, a clutter profile corresponding to a location of the UE, or one or more criteria to be met for the UE to implement sensitivity time control.

Clause 19. The UE of claim 18, wherein the UE comprises the means for obtaining the sensitivity time control profile based on the sensitivity time control message, with the sensitivity time control message indicating the one or more criteria to be met for the UE to implement sensitivity time control, and wherein the one or more criteria to be met for the UE to implement sensitivity time control include at least one of: an area, a signal strength of the sensing signal, a signal-to-noise ratio of the sensing signal, a signal-to-interference-plus-noise ratio of the sensing signal, or a dynamic range of the sensing signal.

Clause 20. The UE of claim 18, wherein the UE comprises the means for obtaining the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 21. The UE of claim 18, wherein the sensitivity time control profile is a first sensitivity time control profile, wherein the UE comprises the means for obtaining the sensitivity time control profile based on the sensitivity time control message, with the sensitivity time control message indicating the first sensitivity time control profile and a second time control profile, and indicating prioritization information, and wherein the means for implementing the first sensitivity time control profile comprise means for implementing the first sensitivity time control profile based on the prioritization information.

Clause 22. The UE of claim 17, wherein the UE comprises the means for transmitting the sensing report to the network entity, with the sensing report indicating that the sensitivity time control profile was implemented by the UE to obtain the sensing signal measurement and indicating one or more conditions corresponding to implementation of the sensitivity time control profile.

Clause 23. The UE of claim 17, further comprising means for transmitting, to the network entity, a capability message indicating a first capability of the UE to implement sensitivity time control to obtain a sensing signal measurement.

Clause 24. The UE of claim 23, wherein the capability message indicates a second capability of the UE to implement different sensitivity time control profiles based on at least one of sensing signal frequency, sensing signal direction, sensing signal polarization, or sensing signal pulse configuration.

Clause 25. A non-transitory, processor-readable storage medium comprising processor-readable instructions to cause one or more processors of a UE (user equipment) to:
implement a sensitivity time control profile to change a gain applied over time to a sensing signal received by the UE; and
measure the sensing signal to obtain a sensing signal measurement;
wherein the storage medium further comprises at least one of:
processor-readable instructions to cause one or more processors of the UE to obtain the sensitivity time control profile based on a sensitivity time control message received by the UE from a network entity; or processor-readable instructions to cause one or more processors of the UE to transmit a sensing report from the UE to the network entity, the sensing report indicating a measurement of the sensing signal and that sensitivity time control was implemented to obtain the sensing signal measurement.

Clause 26. The non-transitory, processor-readable storage medium of claim 25, wherein the non-transitory, processor-readable storage medium comprises the processor-readable instructions to cause one or more processors of the UE to obtain the sensitivity time control profile based on the sensitivity time control message, with the sensitivity time control message indicating at least one of: the sensitivity time control profile, a clutter profile corresponding to a location of the UE, or one or more criteria to be met for the UE to implement sensitivity time control.

Clause 27. The non-transitory, processor-readable storage medium of claim 26, wherein the non-transitory, processor-readable storage medium comprises the processor-readable instructions to cause one or more processors of the UE to obtain the sensitivity time control profile based on the sensitivity time control message, with the sensitivity time control message indicating the one or more criteria to be met for the UE to implement sensitivity time control, and wherein the one or more criteria to be met for the UE to implement sensitivity time control include at least one of: an area, a signal strength of the sensing signal, a signal-to-noise ratio of the sensing signal, a signal-to-interference-plus-noise ratio of the sensing signal, or a dynamic range of the sensing signal.

Clause 28. The non-transitory, processor-readable storage medium of claim 26, wherein the non-transitory, processor-readable storage medium comprises the processor-readable instructions to cause one or more processors of the UE to obtain the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 29. The non-transitory, processor-readable storage medium of claim 26, wherein the sensitivity time control profile is a first sensitivity time control profile, wherein the non-transitory, processor-readable storage medium comprises the processor-readable instructions to cause one or more processors of the UE to obtain the sensitivity time control profile based on the sensitivity time control message, with the sensitivity time control message indicating the first sensitivity time control profile and a second time control profile, and indicating prioritization information, and wherein the processor-readable instructions to cause one or more processors of the UE to implement the first sensitivity time control profile comprise processor-readable instructions to cause one or more processors of the UE to implement the first sensitivity time control profile based on the prioritization information.

Clause 30. The non-transitory, processor-readable storage medium of claim 25, wherein the non-transitory, processor-readable storage medium comprises the processor-readable instructions to cause one or more processors of the UE to transmit the sensing report to the network entity, with the sensing report indicating that the sensitivity time control profile was implemented by the UE to obtain the sensing signal measurement and indicating one or more conditions corresponding to implementation of the sensitivity time control profile.

Clause 31. The non-transitory, processor-readable storage medium of claim 25, further comprising processor-readable instructions to cause one or more processors of the UE to transmit, to the network entity, a capability message indicating a first capability of the UE to implement sensitivity time control to obtain a sensing signal measurement.

Clause 32. The non-transitory, processor-readable storage medium of claim 31, wherein the capability message indicates a second capability of the UE to implement different sensitivity time control profiles based on at least one of sensing signal frequency, sensing signal direction, sensing signal polarization, or sensing signal pulse configuration.

Clause 33. A network entity comprising:
one or more memories;
one or more transceivers; and
one or more processors, communicatively coupled to the one or more memories and the one or more transceivers, configured to:
  determine sensitivity time control configuration information indicating at least one of: a sensitivity time control profile, a clutter profile corresponding to a location, or one or more criteria to be met for a UE (user equipment) to implement sensitivity time control; and
  transmit the sensitivity time control configuration information to the UE via the one or more transceivers.

Clause 34. The network entity of claim 33, wherein the sensitivity time control configuration information indicates the one or more criteria to be met for the UE to implement sensitivity time control, and wherein the one or more criteria to be met for the UE to implement sensitivity time control include at least one of: an area, a signal strength of a sensing signal, a signal-to-noise ratio of the sensing signal, a signal-to-interference-plus-noise ratio of the sensing signal, or a dynamic range of the sensing signal.

Clause 35. The network entity of claim 33, wherein the sensitivity time control configuration information indicates the sensitivity time control profile, and includes at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 36. The network entity of claim 33, wherein the sensitivity time control profile is a first sensitivity time control profile, wherein the sensitivity time control configuration information indicates the first sensitivity time control profile and a second time control profile, and indicates prioritization information indicating how to determine which of the first sensitivity time control profile and the second time control profile for the UE to use to measure a sensing signal.

Clause 37. The network entity of claim 33, wherein the UE is a first UE, wherein:
the one or more processors are further configured to receive, from a second UE via the one or more transceivers, a sensitivity time control report indicating the sensitivity time control profile and one or more operational conditions corresponding to the sensitivity time control profile; and
the one or more processors are at least one of:

configured to transmit, based on the one or more operational conditions being met by the first UE, the sensitivity time control configuration information indicating the sensitivity time control profile to the first UE via the one or more transceivers; or configured to transmit, to the first UE via the one or more transceivers, the sensitivity time control configuration information indicating the sensitivity time control profile and the one or more operational conditions corresponding to the sensitivity time control profile.

Clause 38. A method, for supporting sensitivity time control for sensing by a UE (user equipment), comprising:

determining, at a network entity, sensitivity time control configuration information indicating at least one of: a sensitivity time control profile, a clutter profile corresponding to a location, or one or more criteria to be met for the UE to implement sensitivity time control; and transmitting, from the network entity to the UE, the sensitivity time control configuration information to the UE via the one or more transceivers.

Clause 39. The method of claim 38, wherein the sensitivity time control configuration information indicates the one or more criteria to be met for the UE to implement sensitivity time control, and wherein the one or more criteria to be met for the UE to implement sensitivity time control include at least one of: an area, a signal strength of a sensing signal, a signal-to-noise ratio of the sensing signal, a signal-to-interference-plus-noise ratio of the sensing signal, or a dynamic range of the sensing signal.

Clause 40. The method of claim 38, wherein the sensitivity time control configuration information indicates the sensitivity time control profile, and includes at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 41. The method of claim 38, wherein the sensitivity time control profile is a first sensitivity time control profile, wherein the sensitivity time control configuration information indicates the first sensitivity time control profile and a second time control profile, and indicates prioritization information indicating how to determine which of the first sensitivity time control profile and the second time control profile for the UE to use to measure a sensing signal.

Clause 42. The method of claim 38, wherein the UE is a first UE, wherein: the method further comprises receiving, by the network entity from a second UE, a sensitivity time control report indicating the sensitivity time control profile and one or more operational conditions corresponding to the sensitivity time control profile; and the method further comprises at least one of:
transmitting, from the network entity to the first UE based on the one or more operational conditions being met by the first UE, the sensitivity time control configuration information indicating the sensitivity time control profile; or transmitting, from the network entity to the first UE, the sensitivity time control configuration information indicating the sensitivity time control profile and the one or more operational conditions corresponding to the sensitivity time control profile.

Clause 43. A network entity comprising:
means for determining sensitivity time control configuration information indicating at least one of: a sensitivity time control profile, a clutter profile corresponding to a location, or one or more criteria to be met for a UE (user equipment) to implement sensitivity time control; and means for transmitting, to the UE, the sensitivity time control configuration information to the UE via the one or more transceivers.

Clause 44. The network entity of claim 43, wherein the sensitivity time control configuration information indicates the one or more criteria to be met for the UE to implement sensitivity time control, and wherein the one or more criteria to be met for the UE to implement sensitivity time control include at least one of: an area, a signal strength of a sensing signal, a signal-to-noise ratio of the sensing signal, a signal-to-interference-plus-noise ratio of the sensing signal, or a dynamic range of the sensing signal.

Clause 45. The network entity of claim 43, wherein the sensitivity time control configuration information indicates the sensitivity time control profile, and includes at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 46. The network entity of claim 43, wherein the sensitivity time control profile is a first sensitivity time control profile, wherein the sensitivity time control configuration information indicates the first sensitivity time control profile and a second time control profile, and indicates prioritization information indicating how to determine which of the first sensitivity time control profile and the second time control profile for the UE to use to measure a sensing signal.

Clause 47. The network entity of claim 43, wherein the UE is a first UE, wherein:
the network entity comprises means for receiving, from a second UE, a sensitivity time control report indicating the sensitivity time control profile and one or more operational conditions corresponding to the sensitivity time control profile; and the network entity further comprises at least one of:
means for transmitting, to the first UE based on the one or more operational conditions being met by the first UE, the sensitivity time control configuration information indicating the sensitivity time control profile; or means for transmitting, to the first UE, the sensitivity time control configuration information indicating the sensitivity time control profile and the one or more operational conditions corresponding to the sensitivity time control profile.

Clause 48. A non-transitory, processor-readable storage medium comprising processor-readable instructions to cause one or more processors of a network entity to:

determine sensitivity time control configuration information indicating at least one of: a sensitivity time control profile, a clutter profile corresponding to a location, or one or more criteria to be met for a UE (user equipment) to implement sensitivity time control; and transmit, to the UE, the sensitivity time control configuration information to the UE via the one or more transceivers.

Clause 49. The non-transitory, processor-readable storage medium of claim 48, wherein the sensitivity time control configuration information indicates the one or more criteria to be met for the UE to implement sensitivity time control, and wherein the one or more criteria to be met for the UE to implement sensitivity time control include at least one of: an area, a signal strength of a sensing signal, a signal-to-noise ratio of the sensing signal, a signal-to-interference-plus-noise ratio of the sensing signal, or a dynamic range of the sensing signal.

Clause 50. The non-transitory, processor-readable storage medium of claim 48, wherein the sensitivity time control configuration information indicates the sensitivity time control profile, and includes at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

Clause 51. The non-transitory, processor-readable storage medium of claim 48, wherein the sensitivity time control profile is a first sensitivity time control profile, wherein the sensitivity time control configuration information indicates the first sensitivity time control profile and a second time control profile, and indicates prioritization information indicating how to determine which of the first sensitivity time control profile and the second time control profile for the UE to use to measure a sensing signal.

Clause 52. The non-transitory, processor-readable storage medium of claim 48, wherein the UE is a first UE, wherein:
the non-transitory, processor-readable storage medium further comprises processor-readable instructions to cause the one or more processors of the network entity to receive, from a second UE, a sensitivity time control report indicating the sensitivity time control profile and one or more operational conditions corresponding to the sensitivity time control profile; and
the non-transitory, processor-readable storage medium further comprises at least one of:
processor-readable instructions to cause the one or more processors of the network entity to transmit, to the first UE based on the one or more operational conditions being met by the first UE, the sensitivity time control configuration information indicating the sensitivity time control profile; or
processor-readable instructions to cause the one or more processors of the network entity to transmit, to the first UE, the sensitivity time control configuration information indicating the sensitivity time control profile and the one or more operational conditions corresponding to the sensitivity time control profile.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE user equipment (UE) comprising:
one or more memories;
one or more transceivers configured to receive a sensing signal; and
one or more processors, communicatively coupled to the one or more memories and the one or more transceivers, configured to:
implement a sensitivity time control profile to change a gain applied over time to the sensing signal by the one or more transceivers;
measure the sensing signal to obtain a sensing signal measurement; and
obtain the sensitivity time control profile based on a sensitivity time control message received from a first network entity via the one or more transceivers and/or transmit a sensing report to a second network entity via the one or more transceivers, the sensing report indicating a measurement of the sensing signal and whether first sensitivity time control was implemented to obtain the sensing signal measurement.

2. The UE of claim 1, wherein the one or more processors are configured to obtain the sensitivity time control profile based on the sensitivity time control message with the sensitivity time control message indicating at least one of: the sensitivity time control profile, a clutter profile corresponding to a location of the UE, or one or more criteria to be met for the UE to implement second sensitivity time control.

3. The UE of claim 2, wherein the one or more processors are configured to obtain the sensitivity time control profile based on the sensitivity time control message, with the sensitivity time control message indicating the one or more criteria to be met for the UE to implement the second sensitivity time control, and wherein the one or more criteria to be met for the UE to implement the second sensitivity time control include at least one of: an area of the location of the UE, a signal strength of the sensing signal, a signalto-noise ratio of the sensing signal, a signal-to-interference-plus-noise ratio of the sensing signal, or a dynamic range of the sensing signal.

4. The UE of claim 2, wherein the one or more processors are configured to obtain the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

5. The UE of claim 2, wherein the sensitivity time control profile is a first sensitivity time control profile, wherein the one or more processors are configured to obtain the sensitivity time control profile based on the sensitivity time control message, with the sensitivity time control message indicating the first sensitivity time control profile and a second sensitivity time control profile, and indicating prioritization information, and wherein the one or more processors are configured to determine to implement the first sensitivity time control profile based on the prioritization information.

6. The UE of claim 1, wherein the one or more processors are configured to transmit the sensing report to the second network entity, with the sensing report indicating that the sensitivity time control profile was implemented by the one or more processors to obtain the sensing signal measurement and indicating one or more conditions corresponding to implementation of the sensitivity time control profile.

7. The UE of claim 1, wherein the one or more processors are further configured to transmit, to the second network entity via the one or more transceivers, a capability message indicating a first capability of the UE to implement sensitivity time control to obtain the sensing signal measurement.

8. The UE of claim 7, wherein the capability message indicates a second capability of the UE to implement different sensitivity time control profiles based on at least one of; sensing signal frequency, sensing signal direction, sensing signal polarization, or sensing signal pulse configuration.

9. A sensing method comprising:
   implementing, at a user equipment (UE), a sensitivity time control profile to change a gain applied over time to a sensing signal received by the UE; and
   measuring the sensing signal to obtain a sensing signal measurement;
   wherein the method further comprises at least one of:
      obtaining the sensitivity time control profile based on a sensitivity time control message received by the UE from a first network entity; or
      transmitting a sensing report from the UE to a second network entity, the sensing report indicating a measurement of the sensing signal and that first sensitivity time control was implemented to obtain the sensing signal measurement.

10. The sensing method of claim 9, wherein the method comprises obtaining the sensitivity time control profile based on the sensitivity time control message, with the sensitivity time control message indicating at least one of: the sensitivity time control profile, a clutter profile corresponding to a location of the UE, or one or more criteria to be met for the UE to implement second sensitivity time control.

11. The sensing method of claim 10, wherein the method comprises obtaining the sensitivity time control profile based on the sensitivity time control message, with the sensitivity time control message indicating the one or more criteria to be met for the UE to implement the second sensitivity time control, and wherein the one or more criteria to be met for the UE to implement the second sensitivity time control include at least one of: an area of the location of the UE, a signal strength of the sensing signal, a signal-to-noise ratio of the sensing signal, a signal-to-interference-plus-noise ratio of the sensing signal, or a dynamic range of the sensing signal.

12. The sensing method of claim 10, wherein the method comprises obtaining the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

13. The sensing method of claim 10, wherein the sensitivity time control profile is a first sensitivity time control profile, wherein the method comprises obtaining the sensitivity time control profile based on the sensitivity time control message, with the sensitivity time control message indicating the first sensitivity time control profile and a second sensitivity time control profile, and indicating prioritization information, and wherein implementing the first sensitivity time control profile comprises implementing the first sensitivity time control profile based on the prioritization information.

14. The sensing method of claim 9, wherein the method comprises transmitting the sensing report to the second network entity, with the sensing report indicating that the sensitivity time control profile was implemented by the UE to obtain the sensing signal measurement and indicating one or more conditions corresponding to implementation of the sensitivity time control profile.

15. The sensing method of claim 9, further comprising transmitting, from the UE to the second network entity, a capability message indicating a first capability of the UE to implement sensitivity time control to obtain the sensing signal measurement.

16. The sensing method of claim 15, wherein the capability message indicates a second capability of the UE to implement different sensitivity time control profiles based on at least one of: sensing signal frequency, sensing signal direction, sensing signal polarization, or sensing signal pulse configuration.

17. A user equipment (UE) comprising:
   means for implementing a sensitivity time control profile to change a gain applied over time to a sensing signal received by the UE; and
   means for measuring the sensing signal to obtain a sensing signal measurement;
   wherein the UE further comprises at least one of:
      means for obtaining the sensitivity time control profile based on a sensitivity time control message received by the UE from a first network entity; or
      means for transmitting a sensing report from the UE to a second network entity, the sensing report indicating a measurement of the sensing signal and that first sensitivity time control was implemented to obtain the sensing signal measurement.

18. The UE of claim 17, wherein the UE comprises the means for obtaining the sensitivity time control profile based on the sensitivity time control message, with the sensitivity time control message indicating at least one of: the sensitivity time control profile, a clutter profile corresponding to a location of the UE, or one or more criteria to be met for the UE to implement second sensitivity time control.

19. The UE of claim 18, wherein the UE comprises the means for obtaining the sensitivity time control profile based on the sensitivity time control message, with the sensitivity time control message indicating the one or more criteria to be met for the UE to implement the second sensitivity time control, and wherein the one or more criteria to be met for the UE to implement the second sensitivity time control include at least one of: an area of the location of the UE, a signal strength of the sensing signal, a signal-to-noise ratio of the sensing signal, a signal-to-interference-plus-noise ratio of the sensing signal, or a dynamic range of the sensing signal.

20. The UE of claim 18, wherein the UE comprises the means for obtaining the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

21. The UE of claim 18, wherein the sensitivity time control profile is a first sensitivity time control profile, wherein the UE comprises the means for obtaining the sensitivity time control profile based on the sensitivity time control message, with the sensitivity time control message indicating the first sensitivity time control profile and a second sensitivity time control profile, and indicating prioritization information, and wherein the means for implementing the first sensitivity time control profile comprise means for implementing the first sensitivity time control profile based on the prioritization information.

22. The UE of claim 17, wherein the UE comprises the means for transmitting the sensing report to the second network entity, with the sensing report indicating that the sensitivity time control profile was implemented by the UE to obtain the sensing signal measurement and indicating one or more conditions corresponding to implementation of the sensitivity time control profile.

23. The UE of claim 17, further comprising means for transmitting, to the second network entity, a capability message indicating a first capability of the UE to implement sensitivity time control to obtain the sensing signal measurement.

24. The UE of claim 23, wherein the capability message indicates a second capability of the UE to implement different sensitivity time control profiles based on at least one of: sensing signal frequency, sensing signal direction, sensing signal polarization, or sensing signal pulse configuration.

25. A non-transitory, processor-readable storage medium comprising processor-readable instructions to cause one or more processors of a user equipment (UE) to:
implement a sensitivity time control profile to change a gain applied over time to a sensing signal received by the UE;
measure the sensing signal to obtain a sensing signal measurement; and
obtain the sensitivity time control profile based on a sensitivity time control message received by the UE from a first network entity and/or transmit a sensing report from the UE to a second network entity, the sensing report indicating a measurement of the sensing signal and that first sensitivity time control was implemented to obtain the sensing signal measurement.

26. The non-transitory, processor-readable storage medium of claim 25, wherein the non-transitory, processor-readable storage medium comprises the processor-readable instructions to cause the one or more processors of the UE to obtain the sensitivity time control profile based on the sensitivity time control message, with the sensitivity time control message indicating at least one of: the sensitivity time control profile, a clutter profile corresponding to a location of the UE, or one or more criteria to be met for the UE to implement second sensitivity time control.

27. The non-transitory, processor-readable storage medium of claim 26, wherein the non-transitory, processor-readable storage medium comprises the processor-readable instructions to cause the one or more processors of the UE to obtain the sensitivity time control profile based on the sensitivity time control message, with the sensitivity time control message indicating the one or more criteria to be met for the UE to implement the second sensitivity time control, and wherein the one or more criteria to be met for the UE to implement the second sensitivity time control include at least one of: an area of the location of the UE, a signal strength of the sensing signal, a signal-to-noise ratio of the sensing signal, a signal-to-interference-plus-noise ratio of the sensing signal, or a dynamic range of the sensing signal.

28. The non-transitory, processor-readable storage medium of claim 26, wherein the non-transitory, processor-readable storage medium comprises the processor-readable instructions to cause the one or more processors of the UE to obtain the sensitivity time control profile based on the sensitivity time control message, with the sensitivity time control message indicating the sensitivity time control profile and including at least one of: a sensing signal frequency range for the sensitivity time control profile, a sensing signal angular range for the sensitivity time control profile, a sensing signal pulse configuration for the sensitivity time control profile, or a sensing signal polarization for the sensitivity time control profile.

29. The non-transitory, processor-readable storage medium of claim 26, wherein the sensitivity time control profile is a first sensitivity time control profile, wherein the non-transitory, processor-readable storage medium comprises the processor-readable instructions to cause the one or more processors of the UE to obtain the sensitivity time control profile based on the sensitivity time control message, with the sensitivity time control message indicating the first sensitivity time control profile and a second sensitivity time control profile, and indicating prioritization information, and wherein the processor-readable instructions to cause the one or more processors of the UE to implement the first sensitivity time control profile comprise processor-readable instructions to cause the one or more processors of the UE to implement the first sensitivity time control profile based on the prioritization information.

30. The non-transitory, processor-readable storage medium of claim 25, wherein the non-transitory, processor-readable storage medium comprises the processor-readable instructions to cause the one or more processors of the UE to transmit the sensing report to the second network entity, with the sensing report indicating that the sensitivity time control profile was implemented by the UE to obtain the sensing signal measurement and indicating one or more conditions corresponding to implementation of the sensitivity time control profile.

* * * * *